US011903022B2

United States Patent
Islam et al.

(10) Patent No.: US 11,903,022 B2
(45) Date of Patent: Feb. 13, 2024

(54) SIGNALING TO INDICATE LOCATIONS OF DEDICATED RANDOM ACCESS CHANNEL REGION IN TIME DOMAIN

(71) Applicant: QUALCOMM Incorporated, San Diego, CA (US)

(72) Inventors: Muhammad Nazmul Islam, Littleton, MA (US); Linhai He, San Diego, CA (US); Navid Abedini, Somerset, NJ (US); Bilal Sadiq, Basking Ridge, NJ (US); Juergen Cezanne, Ocean Township, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/256,790

(22) Filed: Jan. 24, 2019

(65) Prior Publication Data
US 2019/0313447 A1    Oct. 10, 2019

Related U.S. Application Data

(60) Provisional application No. 62/653,542, filed on Apr. 5, 2018.

(51) Int. Cl.
*H04W 74/04*    (2009.01)
*H04W 74/08*    (2009.01)
(Continued)

(52) U.S. Cl.
CPC ........... *H04W 74/04* (2013.01); *H04W 72/12* (2013.01); *H04W 72/1263* (2013.01);
(Continued)

(58) Field of Classification Search
CPC ............. H04W 74/04; H04W 74/0833; H04W 72/1205; H04W 72/1263; H04W 74/002; H04W 72/0446; H04W 74/006
See application file for complete search history.

(56) References Cited

U.S. PATENT DOCUMENTS 10,244,490 B2    3/2019 Islam et al.
2016/0278127 A1*    9/2016 Sunell ............... H04W 74/0833
(Continued)

FOREIGN PATENT DOCUMENTS

EP        3714656 A1    9/2020
WO    WO-2015142239 A1    9/2015
(Continued)

OTHER PUBLICATIONS

Huawei et al., "SSB and CSI-RS for RACH (H219, H231, H232 +others)", 3GPP Draft, R2-1801197 SSB and CSI-RS for RACH, 3rd Generation Partnership Project (3GPP), Mobile Competence Centre, 650, Route Des Lucioles, F-06921 Sophia-Antipolis Cedex, France, vol. RAN WG2, No. Vancouver, Canada, Jan. 22, 2017-Jan. 26, 2017, Jan. 17, 2018 (Jan. 17, 2018), XP051386962, 9 Pages, Retrieved from the Internet:URL:http://www.3gpp.org/ftp/tsg%5Fran/WG2%5FRL2/TSGR2%5FAHs/2018%5F01%5FNR/Docs/ [retrieved on Jan. 17, 2018].
(Continued)

*Primary Examiner* — Malick A Sohrab
(74) *Attorney, Agent, or Firm* — Holland & Hart LLP/Qualcomm Incorporated

(57) ABSTRACT

Methods, systems, and devices for wireless communications are described. A node (e.g., a base station or network entity) may identify a signal that provides an indication of a location of a contention free random access channel (CFRA) resource within a time region and an indication of a timing pattern for the CFRA resource, the timing pattern associated with a pattern of subsequent instances of the time region in
(Continued)

which the CFRA resource is repeated, wherein the CFRA resource is not a fully overlapping resource with respect to a contention based random access (CBRA) resource. The node may convey the signal to one or more user equipment (UE) to indicate the location and the timing pattern.

27 Claims, 19 Drawing Sheets

(51) Int. Cl.
  *H04W 72/1263* (2023.01)
  *H04W 74/00* (2009.01)
  *H04W 72/12* (2023.01)
  *H04W 72/0446* (2023.01)

(52) U.S. Cl.
  CPC ..... *H04W 74/002* (2013.01); *H04W 74/0833* (2013.01); *H04W 72/0446* (2013.01)

(56) References Cited

U.S. PATENT DOCUMENTS

| | | | |
|---|---|---|---|
| 2017/0280481 A1* | 9/2017 | Stern-Berkowitz | ........................... H04L 5/0092 |
| 2018/0160448 A1* | 6/2018 | Blankenship | ....... H04W 74/004 |
| 2019/0069258 A1* | 2/2019 | Jeon | ..................... H04B 7/0695 |
| 2019/0141731 A1* | 5/2019 | Yoshimoto | ............ H04W 72/12 |
| 2019/0356376 A1* | 11/2019 | You | ..................... H04W 74/02 |
| 2020/0059971 A1* | 2/2020 | Qian | ..................... H04B 7/0695 |
| 2020/0068616 A1* | 2/2020 | Qian | .................. H04W 74/002 |
| 2020/0154326 A1* | 5/2020 | Deenoo | ................. H04W 36/08 |
| 2021/0014889 A1* | 1/2021 | Liu | .................. H04W 74/0833 |
| 2021/0022186 A1* | 1/2021 | Liu | .................. H04W 72/0446 |
| 2021/0112596 A1* | 4/2021 | Park | .................... H04W 74/006 |
| 2021/0195633 A1* | 6/2021 | Ohara | .................. H04L 5/0053 |
| 2021/0352734 A1* | 11/2021 | Svedman | .......... H04W 72/1263 |

FOREIGN PATENT DOCUMENTS

| | | |
|---|---|---|
| WO | WO-2017176805 | 10/2017 |
| WO | WO-2019100254 A1 | 5/2019 |

OTHER PUBLICATIONS

International Search Report and Written Opinion—PCT/US2019/015409—ISA/EPO—dated Apr. 10, 2019 (182924WO).

NTT Docomo et al., "[D312/322] RACH Resources for Contention-Free RA Including BFR", 3GPP Draft, R2-1803777 was R2-1803627_R4, 3rd Generation Partnership Project (3GPP), Mobile Competence Centre, 650, Route Des Lucioles, F-06921 Sophia-Antipolis Cedex, France, vol. RAN WG2, No. Athens, Greece, Feb. 26, 2018-Mar. 2, 2018, Mar. 2, 2018 (Mar. 2, 2018), XP051400891, 7 Pages, Retrieved from the Internet:URL:http://www.3gpp.org/ftp/tsg%5Fran/WG2%5FRL2/TSGR2%5F101/Docs/ [retrieved on Mar. 2, 2018], Annex A.

ZTE, et al., "Consideration on the Signaling Structure for RA", 3GPP TSG-RAN WG2 Meeting #101, R2-1803115, 3rd Generation Partnership Project, Mobile Competence Centre, 650, Route Des Lucioles, F-06921 Sophia-Antipolis Cedex, vol. RAN WG2, No. Athens, Greece, Feb. 26, 2018-Mar. 2, 2018, 9 Pages, Feb. 21, 2018, XP051400795.

* cited by examiner

| PRACH Configuration Index | Preamble format | $n_{SFN}$ mod x = y | | Slot number | Starting symbol | Number of PRACH slots within a 60kHz slot | Number of time domain PRACH occasions within a RACH slot |
|---|---|---|---|---|---|---|---|
| | | x | y | | | | |
| 0 | A1 | 1 | 0 | 4,9,14,19,24,29,34,39 | 0 | 2 or 1 | 6 |
| 15 | A1 | 16 | 0 | 4,9,14,19,24,29,34,39 | 0 | 2 or 1 | 6 |
| 18 | A1 | 8 | 1 | [3,]7,[11,]15,[19,]23,[27,]31,[35,]39 | 0 or 7 | 1 | 6 or 3 |
| 19 | A1 | 4 | 1 | 4,9,14,19,24,29,34,39 | 0 | 2 or 1 | 6 |
| 21 | A1 | 2 | 1 | 4,9,14,19,24,29,34,39 | 0 | 2 or 1 | 6 |

305

300

| Valid SFN config index | $n_{SFN} \bmod x = y$ | |
|---|---|---|
| | x | y |
| 0 | 1 | 0 |
| 1 | 2 | 1 |
| 2 | 4 | 1 |
| 3 | 8 | 1 |
| 4 | 16 | 0 |
| 5 | 16 | 1 |

SIGNALING TO INDICATE LOCATIONS OF DEDICATED RANDOM ACCESS CHANNEL REGION IN TIME DOMAIN

CROSS REFERENCES

The present application for patent claims the benefit of U.S. Provisional Patent Application No. 62/653,542 by ISLAM, et al., entitled "SIGNALING TO INDICATE LOCATIONS OF DEDICATED RANDOM ACCESS CHANNEL REGION IN TIME DOMAIN," filed Apr. 5, 2018, assigned to the assignee hereof, and expressly incorporated herein.

BACKGROUND

The following relates generally to wireless communications, and more specifically to signaling to indicate locations of dedicated random access channel (RACH) region in time domain.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

Wireless communication systems may operate in millimeter wave (mmW) frequency ranges, e.g., 28 GHz, 40 GHz, 60 GHz, etc. Wireless communications at these frequencies may be associated with increased signal attenuation (e.g., path loss), which may be influenced by various factors, such as temperature, barometric pressure, diffraction, etc. As a result, signal processing techniques, such as beamforming, may be used to coherently combine energy and overcome the path losses at these frequencies. Due to the increased amount of path loss in mmW communication systems, transmissions from the base station and/or the UE may be beamformed. Moreover, a receiving device may use beamforming techniques to configure antenna(s) and/or antenna array(s) such that transmissions are received in a directional manner.

In some aspects, wireless communication systems may use time/frequency resources for random access procedures. The random access procedures may include a contention based random access (CBRA) procedure where the device must contend for the channel before attempting access and a contention free random access (CFRA) procedure where resources are preconfigured for the device. In some aspects, the random access procedures may be performed on a physical random access channel (PRACH) and may involve exchanging one or more random access channel (RACH) signals, e.g., a RACH message 1 (msg1), RACH message 2 (msg2), and the like. However, conventional techniques do not provide an efficient and effective mechanism for the network to provide an indication of the configured resources to the UE operating within the coverage area of a base station or a cell.

SUMMARY

The described techniques relate to improved methods, systems, devices, and apparatuses that support signaling to indicate locations of dedicated random access channel (RACH) region in time domain. Generally, the described techniques provide for a node (e.g., a base station and/or a network entity) that provides an indication of a location of the dedicated ratchet resource within a particular time region and also an indication of how often the time region that contains the dedicated RACH resource repeats in time. For example, the node may identify a signal that provides an indication of a location of the CFRA resource within a time region. The signal may also convey an indication of a timing pattern for the CFRA resource. In some aspects, the timing pattern may be associated with or otherwise based on the pattern of subsequent instances of the timing region in which the CFRA resources repeated. Generally, the CFRA resources not a fully overlapping resource (e.g., may partially overlap, but not completely overlap) a resource associated with a contention based random access (CBRA) resource. The node may convey the signal to UE to indicate the location and the timing pattern, and the UE may use a signal to identify at least one instance of the CFRA resource. The UE may transmit a CFRA signal using the identified CFRA resource.

In some aspects, the described techniques provide another mechanism to convey an indication of configured CFRA resources is based on actually transmitted synchronization signal block (SSB) signals. Broadly, the network may signal a new set of the actually transmitted SSBs that allows the UE to find a new mapping pattern from SSBs to the RACH resource. For example, a node (e.g. a base station and/or a network entity) may identify a set of SSB occasions and also a signal for a UE that provides an indication of a number of transmitted SSBs and a CFRA resource that corresponds to the number of transmitted SSBs. Again, the CFRA resource may not fully overlap (e.g. may partially overlap, but not completely overlap) the CBR a resource. The node may transmit or otherwise convey the signal to the UE to provide the indication of the CFRA resource. The UE may receive the signal and identify one or more instances of the CFRA resource, e.g., based on the number of transmitted SSBs. The UE may use the identified CFRA resource to transmit a CFRA signal.

A method of wireless communication at a node is described. The method may include identifying a signal that provides an indication of a location of a CFRA resource within a time region, where the CFRA resource is not a fully overlapping resource with respect to a CBRA resource and conveying the signal to one or more UE to indicate the location.

An apparatus for wireless communication at a node is described. The apparatus may include a processor, memory in electronic communication with the processor, and instructions stored in the memory. The instructions may be executable by the processor to cause the apparatus to identifying a signal that provides an indication of a location of a CFRA resource within a time region, where the CFRA resource is not a fully overlapping resource with respect to a CBRA resource and conveying the signal to one or more UE to indicate the location.

Another apparatus for wireless communication at a node is described. The apparatus may include identifying a signal that provides an indication of a location of a CFRA resource within a time region, where the CFRA resource is not a fully overlapping resource with respect to a CBRA resource and conveying the signal to one or more UE to indicate the location.

A non-transitory computer-readable medium storing code for wireless communication at a node is described. The code may include instructions executable by a processor to identifying a signal that provides an indication of a location of a CFRA resource within a time region, where the CFRA resource is not a fully overlapping resource with respect to a CBRA resource and conveying the signal to one or more UE to indicate the location.

Some examples of the method, apparatuses, and non-transitory computer-readable medium described herein may further include operations, features, means, or instructions for identifying the signal that provides an indication of a timing pattern for the CFRA resource, the timing pattern associated with a pattern of subsequent instances of the time region in which the CFRA resource is repeated, wherein the timing pattern comprises at least one of a periodic pattern or an aperiodic pattern and conveying the signal to the one or more UE to indicate the timing pattern.

Some examples of the method, apparatuses, and non-transitory computer-readable medium described herein may further include operations, features, means, or instructions for identifying one or more symbols within the time region in which the CFRA resource will occur, where the location may be based on the one or more symbols.

In some examples of the method, apparatuses, and non-transitory computer-readable medium described herein, the location includes a starting symbol of the CFRA resource.

Some examples of the method, apparatuses, and non-transitory computer-readable medium described herein may further include operations, features, means, or instructions for identifying a subset of time regions from a set of time regions, each time region within the subset of time regions including one or more instances of the CFRA resource, where the timing pattern for the CFRA resource may be based on the subset of time regions.

Some examples of the method, apparatuses, and non-transitory computer-readable medium described herein may further include operations, features, means, or instructions for configuring the signal to convey an indication of a physical random access channel (PRACH) configuration index to provide the indication of at least one of the location of the CFRA resource, or the timing pattern, or a combination thereof.

Some examples of the method, apparatuses, and non-transitory computer-readable medium described herein may further include operations, features, means, or instructions for receiving, during at least one instance of the CFRA resource within the time region, a RACH transmission using the CFRA resource.

In some examples of the method, apparatuses, and non-transitory computer-readable medium described herein, the signal may be conveyed in a first radio frequency spectrum band and the RACH transmission may be received in a second radio frequency spectrum band, the second radio frequency spectrum band being different from the first radio frequency spectrum band.

In some examples of the method, apparatuses, and non-transitory computer-readable medium described herein, the signal may be conveyed in a first RAT and the RACH transmission may be received in a second RAT, the second RAT being different from the first RAT.

In some examples of the method, apparatuses, and non-transitory computer-readable medium described herein, the location of the CFRA resource includes at least one of a symbol within a slot, or a slot within a subframe, or a subframe within a radio frame, or a radio frame within a set of radio frames, or a combination thereof.

In some examples of the method, apparatuses, and non-transitory computer-readable medium described herein, the CFRA resource may be associated with a time-frequency region, and the CFRA resource may include a RACH occasion.

In some examples of the method, apparatuses, and non-transitory computer-readable medium described herein, the node includes a base station, the base station identifying and conveying the signal.

In some examples of the method, apparatuses, and non-transitory computer-readable medium described herein, the node includes a network entity, the network entity obtaining the signal from a target cell and conveying the signal to a serving cell to be relayed to the UE.

In some examples of the method, apparatuses, and non-transitory computer-readable medium described herein, the time region includes at least one of a frame, a subframe, a slot, or a mini-slot.

In some examples of the method, apparatuses, and non-transitory computer-readable medium described herein, the timing pattern includes at least one of a periodic pattern or an aperiodic pattern.

A method of wireless communication at a UE is described. The method may include receiving a signal that conveys an indication of a location of a CFRA resource within a time region, where the CFRA resource is not a fully overlapping resource with respect to a CBRA resource, identifying, based on the location, at least one instance of the CFRA resource, and transmitting a CFRA signal using the identified instance of the CFRA resource.

An apparatus for wireless communication at a UE is described. The apparatus may include a processor, memory in electronic communication with the processor, and instructions stored in the memory. The instructions may be executable by the processor to cause the apparatus to receiving a signal that conveys an indication of a location of a CFRA resource within a time region, where the CFRA resource is not a fully overlapping resource with respect to a CBRA resource, identifying, based on the location, at least one instance of the CFRA resource, and transmitting a CFRA signal using the identified instance of the CFRA resource.

Another apparatus for wireless communication at a UE is described. The apparatus may include receiving a signal that conveys an indication of a location of a CFRA resource within a time region, where the CFRA resource is not a fully overlapping resource with respect to a CBRA resource, identifying, based on the location, at least one instance of the CFRA resource, and transmitting a CFRA signal using the identified instance of the CFRA resource.

A non-transitory computer-readable medium storing code for wireless communication at a UE is described. The code may include instructions executable by a processor to receiving a signal that conveys an indication of a location of a CFRA resource within a time region, where the CFRA resource is not a fully overlapping resource with respect to a CBRA resource, identifying, based on the location, at least one instance of the CFRA resource, and transmitting a CFRA signal using the identified instance of the CFRA resource.

Some examples of the method, apparatuses, and non-transitory computer-readable medium described herein may further include operations, features, means, or instructions for receiving the signal that conveys an indication of a timing pattern for the CFRA resource, the timing pattern associated with a pattern of subsequent instances of the time region in which the CFRA resource is repeated, wherein the timing pattern comprises at least one of a periodic pattern or an aperiodic pattern and identifying, based at least in part on the timing pattern, the at least one instance of the CFRA resource.

Some examples of the method, apparatuses, and non-transitory computer-readable medium described herein may further include operations, features, means, or instructions for identifying, based on the signal, one or more symbols within the time region in which the CFRA resource will occur, where the at least one instance of the CFRA resource may be identified based on the one or more symbols.

In some examples of the method, apparatuses, and non-transitory computer-readable medium described herein, the at least one instance of the CFRA resource occurs at a starting symbol of the CFRA resource.

Some examples of the method, apparatuses, and non-transitory computer-readable medium described herein may further include operations, features, means, or instructions for identifying, based on the signal, a subset of time regions from a set of time regions, each time region within the subset of time regions including one or more instances of the CFRA resource, where the at least one instance of the CFRA resource may be identified based on the subset of time regions.

Some examples of the method, apparatuses, and non-transitory computer-readable medium described herein may further include operations, features, means, or instructions for decoding the signal to identify an indication of a PRACH configuration index that provides the indication of at least one of the location of the CFRA resource, or the timing pattern, or a combination thereof.

In some examples of the method, apparatuses, and non-transitory computer-readable medium described herein, the location of the CFRA resource includes at least one of a symbol within a slot, or a slot within a subframe, or a subframe within a radio frame, or a radio frame within a set of radio frames, or a combination thereof.

In some examples of the method, apparatuses, and non-transitory computer-readable medium described herein, the signal may be received in a first radio frequency spectrum band and the CFRA signal may be transmitted in a second radio frequency spectrum band, the second radio frequency spectrum band being different from the first radio frequency spectrum band.

In some examples of the method, apparatuses, and non-transitory computer-readable medium described herein, the signal may be received in a first RAT and the CFRA signal may be transmitted in a second RAT, the second RAT being different from the first RAT.

In some examples of the method, apparatuses, and non-transitory computer-readable medium described herein, the time region includes at least one of a frame, a subframe, a slot, or a mini-slot.

Some examples of the method, apparatuses, and non-transitory computer-readable medium described herein may further include operations, features, means, or instructions for transmitting an indication of the number of transmitted SSBs in an previous feedback report.

In some examples of the method, apparatuses, and non-transitory computer-readable medium described herein, the timing pattern includes at least one of a periodic pattern or an aperiodic pattern.

A method of wireless communication at a node is described. The method may include identifying a set of SSB occasions, identifying, for a UE, a signal that provides an indication of a number of transmitted SSBs and CFRA resource corresponding to the number of SSBs, where the number of transmitted SSBs configured for the CFRA resource may be different from a configuration of SSBs associated with the CBRA resource, and conveying the signal to the UE to indicate the CFRA resource.

An apparatus for wireless communication at a node is described. The apparatus may include a processor, memory in electronic communication with the processor, and instructions stored in the memory. The instructions may be executable by the processor to cause the apparatus to identifying a set of SSB occasions, identifying, for a UE, a signal that provides an indication of a number of transmitted SSBs and CFRA resource corresponding to the number of SSBs, where the number of transmitted SSBs configured for the CFRA resource may be different from a configuration of SSBs associated with the CBRA resource, and conveying the signal to the UE to indicate the CFRA resource.

Another apparatus for wireless communication at a node is described. The apparatus may include identifying a set of SSB occasions, identifying, for a UE, a signal that provides an indication of a number of transmitted SSBs and CFRA resource corresponding to the number of SSBs, where the number of transmitted SSBs configured for the CFRA resource may be different from a configuration of SSBs associated with the CBRA resource, and conveying the signal to the UE to indicate the CFRA resource.

A non-transitory computer-readable medium storing code for wireless communication at a node is described. The code may include instructions executable by a processor to identifying a set of SSB occasions, identifying, for a UE, a signal that provides an indication of a number of transmitted SSBs and CFRA resource corresponding to the number of SSBs, where the number of transmitted SSBs configured for the CFRA resource may be different from a configuration of SSBs associated with the CBRA resource, and conveying the signal to the UE to indicate the CFRA resource.

In some examples of the method, apparatuses, and non-transitory computer-readable medium described herein, the CRRA resource is not a fully overlapping resources with respect to a CBRA resource.

Some examples of the method, apparatuses, and non-transitory computer-readable medium described herein may further include operations, features, means, or instructions for determining a detected number of SSBs by the UE and selecting the number of transmitted SSBs based on the detected number of SSBs by the UE.

Some examples of the method, apparatuses, and non-transitory computer-readable medium described herein may further include operations, features, means, or instructions for receiving an indication of the detected number of SSBs from a network entity.

Some examples of the method, apparatuses, and non-transitory computer-readable medium described herein may further include operations, features, means, or instructions for configuring the signal to provide an indication of an SSB index, where the SSB index indicates a specific RACH occasion for a CFRA transmission within a subset of RACH occasions.

Some examples of the method, apparatuses, and non-transitory computer-readable medium described herein may further include operations, features, means, or instructions for identifying a first timing pattern associated with the CBRA resources and configuring a second timing pattern associated with the CFRA resources, where the second timing pattern does not overlap with the first timing pattern.

Some examples of the method, apparatuses, and non-transitory computer-readable medium described herein may further include operations, features, means, or instructions for receiving a RACH transmission from the UE during at least one instance of the multiple instances occurring within the timing window.

In some examples of the method, apparatuses, and non-transitory computer-readable medium described herein, a location of the CFRA resource includes at least one of a symbol within a slot, or a slot within a subframe, or a subframe within a radio frame, or a radio frame within a set of radio frames, or a combination thereof.

In some examples of the method, apparatuses, and non-transitory computer-readable medium described herein, the timing window includes at least one of a frame, a subframe, a slot, or a mini-slot.

In some examples of the method, apparatuses, and non-transitory computer-readable medium described herein, the node includes a base station, the base station identifying and conveying the signal.

In some examples of the method, apparatuses, and non-transitory computer-readable medium described herein, the node includes a network entity, the network entity obtaining the signal from a target cell and conveying the signal to a serving cell to be relayed to the UE.

A method of wireless communication at a UE is described. The method may include receiving a signal that provides an indication of a number of transmitted SSBs and a CFRA resource corresponding to the number of SSBs, where the number of transmitted SSBs configured for the CFRA resource may be different from a configuration of SSBs associated with the CBRA resource, identifying, based on the signal, one or more of instances of the CFRA resource, and transmitting a CFRA signal using the identified CFRA resource.

An apparatus for wireless communication at a UE is described. The apparatus may include a processor, memory in electronic communication with the processor, and instructions stored in the memory. The instructions may be executable by the processor to cause the apparatus to receiving a signal that provides an indication of a number of transmitted SSBs and a CFRA resource corresponding to the number of SSBs, where the number of transmitted SSBs configured for the CFRA resource may be different from a configuration of SSBs associated with the CBRA resource, identifying, based on the signal, one or more of instances of the CFRA resource, and transmitting a CFRA signal using the identified CFRA resource.

Another apparatus for wireless communication at a UE is described. The apparatus may include receiving a signal that provides an indication of a number of transmitted SSBs and a CFRA resource corresponding to the number of SSBs, the number of transmitted SSBs configured for the CFRA resource may be different from a configuration of SSBs associated with the CBRA resource, identifying, based on the signal, one or more of instances of the CFRA resource, and transmitting a CFRA signal using the identified CFRA resource.

A non-transitory computer-readable medium storing code for wireless communication at a UE is described. The code may include instructions executable by a processor to receiving a signal that provides an indication of a number of transmitted SSBs and a CFRA resource corresponding to the number of SSBs, where the number of transmitted SSBs configured for the CFRA resource may be different from a configuration of SSBs associated with the CBRA resource, identifying, based on the signal, one or more of instances of the CFRA resource, and transmitting a CFRA signal using the identified CFRA resource.

In some examples of the method, apparatuses, and non-transitory computer-readable medium described herein, the CFRA resource is not a fully overlapping resource with respect to a CBRA resource.

Some examples of the method, apparatuses, and non-transitory computer-readable medium described herein may further include operations, features, means, or instructions for decoding the signal to identify an indication of an SSB index, where the SSB index indicates a specific RACH occasion for a CFRA transmission with a subset of RACH occasions.

In some examples of the method, apparatuses, and non-transitory computer-readable medium described herein, a location of the CFRA resource includes at least one of a symbol within a slot, or a slot within a subframe, or a subframe within a radio frame, or a radio frame within a set of radio frames, or a combination thereof.

BRIEF DESCRIPTION OF THE DRAWINGS

FIG. 4 illustrates an example of a table that supports signaling to indicate locations of dedicated RACH region in time domain in accordance with aspects of the present disclosure.

DETAILED DESCRIPTION

Figure 1:
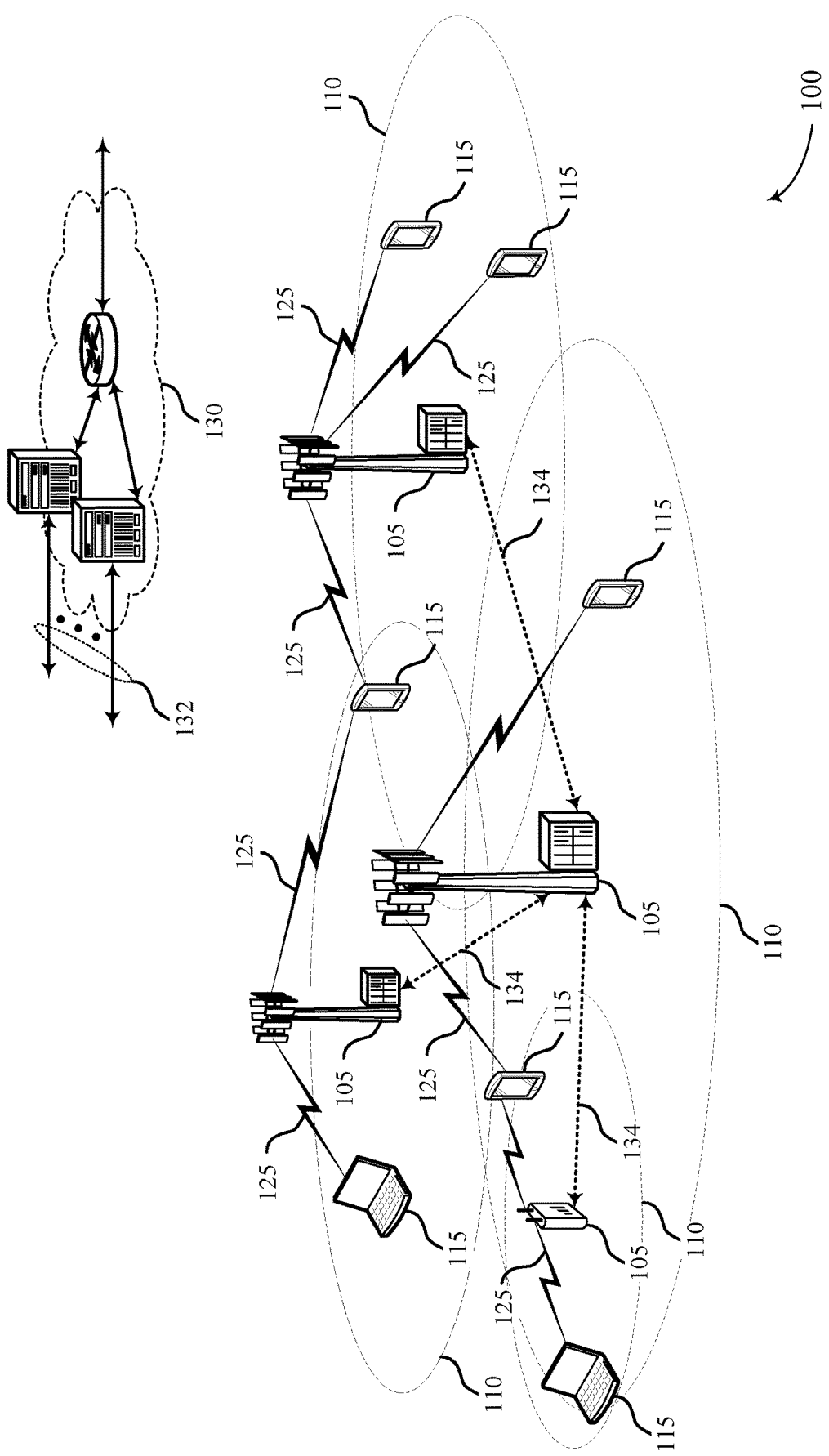
FIG. 1 illustrates an example of a wireless communications system that supports signaling to indicate locations of dedicated random access channel (RACH) region in time domain in accordance with aspects of the present disclosure.

Some wireless communication systems may operate in millimeter wave (mmW) frequency ranges (e.g., 28 GHz, 40 GHz, 60 GHz, etc.). In some cases, wireless communication at these frequencies may be associated with increased signal attenuation (e.g., path loss), which may be influenced by various factors, such as temperature, barometric pressure, diffraction, etc. As a result, signal processing techniques such as beamforming (i.e., directional transmission) may be used to coherently combine signal energy and overcome the path loss in specific beam directions. In some cases, a device may select an active beam for communicating with a network by selecting the strongest beam from among a number of candidate beams.

Some wireless communication systems support resources for random access procedures. For example, the network may use periodic and/or aperiodic time/frequency resources that user equipment (UE) use to perform random access procedures. The random access procedures may include a contention based random access (CBRA) procedure where the device contends for the channel and a contention free random access (CFRA) procedure where time/frequency resources are preconfigured for the device. In some aspects, the random access procedures may be performed on a physical random access channel (PRACH) and may involve exchanging one or more random access channel (RACH) signals, e.g., a RACH message 1 (msg1), RACH message 2 (msg2), and the like. However, conventional signaling techniques do not provide an efficient and effective mechanism for the network to provide an indication of the configured resources to the UE. For example, conventional signaling techniques include the UE being configured on a per-resource basis, which increased overhead and delays the RACH occasion.

Aspects of the disclosure are initially described in the context of a wireless communications system. Generally, the described techniques provide for a node (e.g., a base station and/or a network entity) that provides an indication of a location of the dedicated RACH resource within a particular time region and also an indication of how often the time region that contains the dedicated RACH resource repeats in time. For example, the node may identify a signal that provides an indication of a location of the CFRA resource within a time region. The signal may also convey an indication of a timing pattern for the CFRA resource. In some aspects, the timing pattern may be associated with or otherwise based on the pattern of subsequent instances of the timing region in which the CFRA resources are repeated. Generally, the CFRA resources not a fully overlapping resource (e.g., may partially overlap, but not completely overlap) a resource associated with a contention based random access (CBRA) resource. The node may convey the signal to UE to indicate the location and the timing pattern, and the UE may use a signal to identify at least one instance of the CFRA resource. The UE may transmit a CFRA signal using the identified CFRA resource.

In some aspects, the described techniques provide another mechanism to convey an indication of configured CFRA resources is based on actually transmitted synchronization signal block (SSB) signals. Broadly, the network may signal a new set of the actually transmitted SSBs that allows the UE to find a new mapping pattern from SSBs to the RACH resource. For example, a node (e.g. a base station and/or a network entity) may identify a set of SSB occasions and also a signal for a UE that provides an indication of a number of transmitted SSBs and a CFRA resource that corresponds to the number of transmitted SSBs. Again, the CFRA resource may not fully overlap (e.g. may partially overlap, but not completely overlap) the CBR a resource. The node may transmit or otherwise convey the signal to the UE to provide the indication of the CFRA resource. The UE may receive the signal and identify one or more instances of the CFRA resource, e.g., based on the number of transmitted SSBs. The UE may use the identified CFRA resource to transmit a CFRA signal.

Aspects of the disclosure are further illustrated by and described with reference to apparatus diagrams, system diagrams, and flowcharts that relate to signaling to indicate locations of dedicated RACH region in time domain.

FIG. 1 illustrates an example of a wireless communications system 100 that supports signaling to indicate locations of dedicated RACH region in time domain in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an Si or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

A base station 105 (or network entity) may identify a signal that provides an indication of a location of a CFRA resource within a time region and an indication of a timing pattern for the CFRA resource, the timing pattern associated with a pattern of subsequent instances of the time region in which the CFRA resource is repeated, wherein the CFRA resource is not a fully overlapping resource with respect to a CBRA resource. The base station 105 may convey the signal to one or more UE 115 to indicate the location and the timing pattern.

A UE 115 may receive a signal that conveys an indication of a location of a CFRA resource within a time region and an indication of a timing pattern for the CFRA resource, the timing pattern associated with a pattern of subsequent instances of the time region in which the CFRA resource is repeated, wherein the CFRA resource is not a fully overlapping resource with respect to a CBRA resource. The UE 115 may identify, based at least in part on the location and the timing pattern, at least one instance of the CFRA resource. The UE 115 may transmit a CFRA signal using the identified instance of the CFRA resource.

A base station 105 (or network entity) may identify a set of SSB occasions. The base station 105 may identify, for a UE 115, a signal that provides an indication of a number of transmitted SSBs and CFRA resource corresponding to the number of SSBs, wherein the CFRA resource is a not a fully overlapping resource with respect to a CBRA resource. The base station 105 may convey the signal to the UE 115 to indicate the CFRA resource.

A UE 115 may receive a signal that provides an indication of a number of transmitted SSBs and a CFRA resource corresponding to the number of SSBs, wherein the CFRA resource is not a fully overlapping resource with respect to a CBRA resource. The UE 115 may identify, based at least in part on the signal, one or more of instances of the CFRA resource. The UE 115 may transmit a CFRA signal using the identified CFRA resource.

Figure 2:
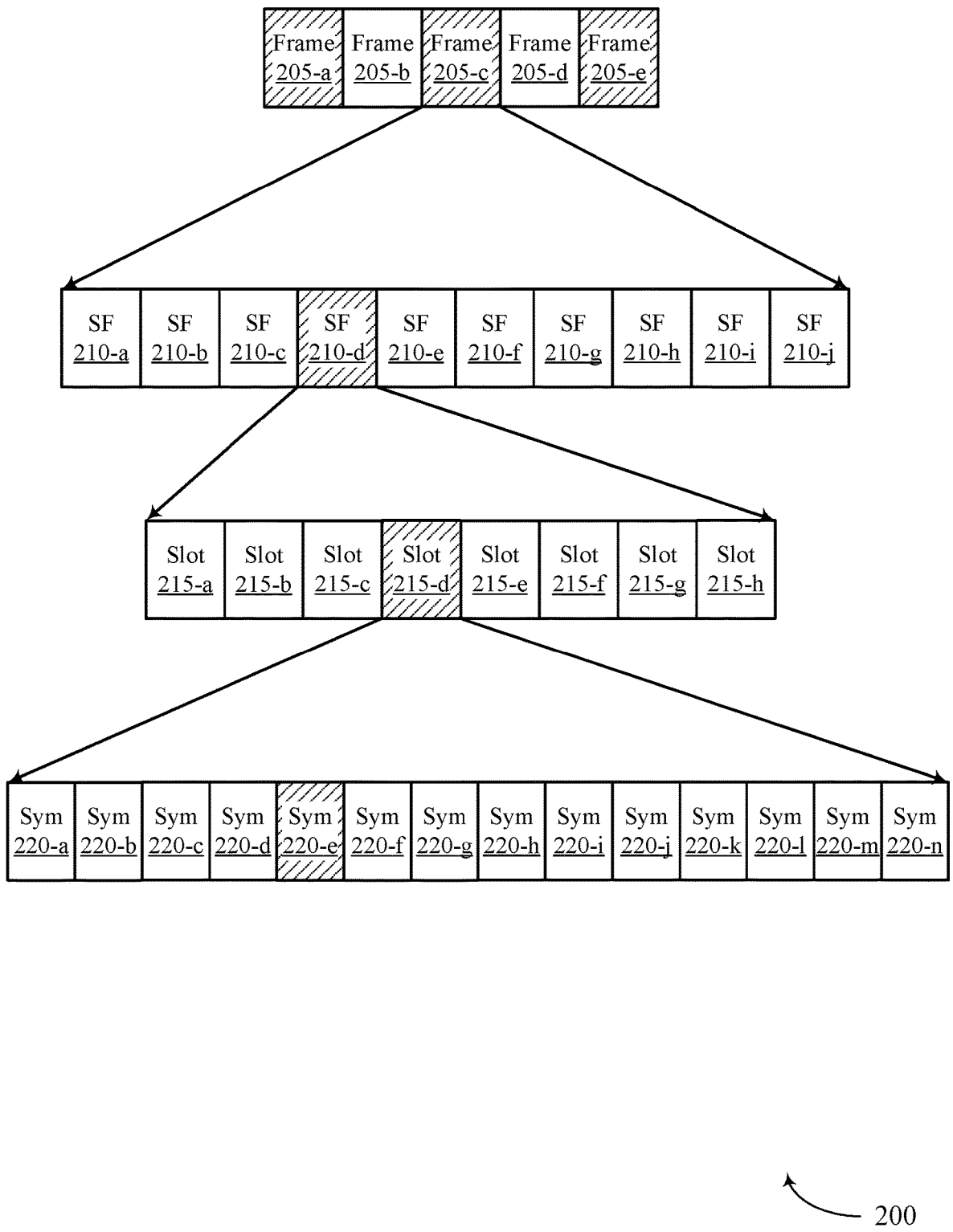
FIG. 2 illustrates an example of a contention free random access (CFRA) resource configuration 200 that supports signaling to indicate locations of dedicated RACH region in time domain in accordance with aspects of the present disclosure.

FIG. 2 illustrates an example of a CFRA resource configuration 200 that supports signaling to indicate locations of dedicated RACH region in time domain in accordance with aspects of the present disclosure. In some examples, CFRA resource configuration 200 may implement aspects of wireless communication system 100. Aspects of CFRA resource configuration 200 may be implemented by a base station and/or a UE, which may be examples of the corresponding devices described herein.

In some aspects, CFRA resource configuration 200 may support configuring dedicated time-frequency regions (e.g., CFRA resources) for CFRA and the signaling to support such resource configurations. In some legacy networks, both CBRA and CFRA occur in the same set of RACH occasions. For example, the network may configure UE(s) with a dedicated preamble for CFRA. However, in some advanced networks (e.g., NR networks, mmW networks, and the like) the periodicity of the RACH configuration may be as long as 160 ms. The long periodicity allows the network to reduce RACH overhead, especially in frequency range (FR) two (FR2) and in the scenarios where the base station cannot frequency division multiplex uplink data with PRACH due to analog beamforming constraints. In some aspects, regarding some FR2 RACH configurations with different periodicities, the periodicity associated with PRACH configuration index 0, 15, 18, 19 and 21 may be 10, 160, 80, 40 and 20 ms, respectively.

However, if the RACH configuration period repeats every 160 ms (and if CFRA and CBRA are mandated to share the same set of RACH occasions), then the UE may have to wait for 160 ms to perform initial transmission and retransmission of CFRA in some scenarios. However, a reduction of handover latency is very important for advanced networks. Accordingly, it would be beneficial if the network had the flexibility to configure CBRA and CFRA in non-overlapping sets of time-frequency resources. If the network has the flexibility to configure CBRA and CFRA in different sets of time-frequency resources, it can simultaneously reduce handover latency for CFRA and limit CBRA overhead by configuring a long CBRA configuration periodicity. Accordingly, some aspects of the described techniques allow the network to configured dedicated PRACH resources for CFRA that do not overlap (at least do not completely overlap) with CBRA resources.

Accordingly, CFRA resource configuration 200 may include a plurality of radio frames 205, with each radio frame 205 comprising a plurality of subframes 210, each subframe 210 comprising a plurality of slots 215, and each slot 215 comprising a plurality of symbols 220. It is to be understood that other configurations (e.g., quantities, arrangements, etc.) may be used for the CFRA resource configuration 200. In the example CFRA resource configuration 200 of FIG. 2, references to a timing region (or time region) may refer to a radio frame 205, which may occur (e.g., be repeated) according to a periodic schedule or an aperiodic schedule. In other example, the timing region may refer to a subframe 210 or to a slot 215. A timing pattern may refer to the pattern in which the time region (e.g., the radio frame 205 in this example) repeats the CFRA resource. In the example CFRA resource configuration 200, the timing pattern may be a periodic pattern where the CFRA resource occurs within every other radio frame 205 (e.g., during radio frames 205-*a*, 205-*c*, and 205-*d*). However, in other examples the CFRA resource may occur according to an aperiodic schedule. In some aspects, the network (e.g., via a base station) may configure a RACH occasion in any symbol (e.g., in symbol 220-*e*) in the time domain (e.g., the timing region or radio frame 205). The network may signal the actual resource (e.g., the CFRA resource) for the first RACH preamble transmission (e.g., for slot 220-*e* of radio frame 205-*b*) and its subsequent retransmissions (e.g., for corresponding slots for frame 205-*e*). In some aspects, references to a RACH resource may also refer to a PRACH resource, a CFRA resource, a RACH occasion, a CFRA occasion, and the like.

In some aspects, this may include the network generating or otherwise identifying that signal to provide an indication of the starting symbol (e.g., symbol 220-*e*) of the dedicated PRACH configuration (e.g., the CFRA resource) within a certain time region (for radio frame 205-*c*). The network may also signal how often a time region containing the dedicated PRACH configuration repeats in time (e.g., the timing pattern that also identifies frame 205-*e*, and so on). The overhead to enable this signaling may depend on the granularity of the time region, containing the starting symbol of the dedicated RACH resources, and the repetition pattern of the time region. In some aspects, the described techniques may be performed by a base station that identifies and conveys the signal. In other aspects, the described techniques may be performed by a network entity that obtains a signal from a target cell (e.g. in a handover situation) and conveys a signal to the serving cell to be relayed to the UE.

Thus, in the example CFRA resource configuration 200, each alternative radio frame (e.g., radio frame 205) contains a dedicated RACH occasion for CFRA. The starting symbol (e.g., symbol 220-*e*) of the dedicated RACH occasion can be anywhere within the radio frame 205. Hence, the network may signal 11 bits (e.g., log 2(10*8*14=10.13) to convey an indication of the starting symbol of the PRACH resource within the radio frame 205-*c*. In some aspects, the network may also generate the signal to convey that alternate radio frames (e.g., radio frame 205-*e*) are available for this dedicated PRACH resource, e.g., for retransmission opportunities. The number of bits used to convey this indication may depend on the number of possible repetition patterns (e.g., timing patterns) for the set of radio frames 205 that contain dedicated RACH regions.

Accordingly, the network may transmit (e.g., via a base station) the signal to a UE to convey the indication of the location of the CFRA resource (e.g., the location of symbol 220-*e*) and also the timing pattern for the repeated occasions of the CFRA resource (e.g., the pattern of subsequent instances of the time region in which the CFRA resource is repeated).

In some aspects, this may include signaling schemes that enable the network to signal a dedicated RACH resource for CFRA resources that do not overlap (or at least do not completely overlap) with CBRA resources, e.g., in the time and/or frequency domain. The network may transmit a signal conveying an indication of two types of signaling. The signal may include an indication of the location of dedicated RACH resource within a particular time region (e.g., radio frames 205-*a*, 205-*c*, and 205-*e*). In some examples, the location may include a starting symbol of RACH resource (e.g., symbol 220-*e*). The signal may include an indication of how often the time region, containing available configured RACH resource, repeats in the time domain (may identify that alternate radio frames 205 include a configured RACH resource. This may provide an indication of resources the UE can use for RACH retransmission(s).

In some examples, the set of repetition patterns (e.g., the timing pattern) in the time domain may depend on possible repetition patterns for CBRA configurations. For example, CBRA configurations may repeat after every 10, 20, 40, 80 and 160 ms. Hence, in some aspects the timing pattern may include at least five different repetition patterns for CFRA dedicated RACH resources, but that do not overlap (at least not completely) with the CBRA resources.

Figure 3:
FIG. 3 illustrates an example of a table that supports signaling to indicate locations of dedicated RACH region in time domain in accordance with aspects of the present disclosure.

FIG. 3 illustrates an example of a table 300 that supports signaling to indicate locations of dedicated RACH region in time domain in accordance with aspects of the present disclosure. In some examples, table 300 may implement aspects of wireless communication system 100 and/or CFRA resource configuration 200. Aspects of table 300 may be implemented by a base station and/or a UE, which may be an example of the corresponding device described herein.

Generally, table 300 generally includes a table 305 that illustrates an example of a random access configuration that may be utilized in accordance with various aspects of the described techniques. The table 305 may include a first column identifying various examples of a PRACH configuration index. In some examples, each PRACH configuration index may refer to a location and/or timing pattern in which configured RACH resources (e.g., CFRA resources) occur within a time region (e.g., for each frame or subframe). For each PRACH configuration index, a corresponding preamble format (e.g., RACH preamble message (msg1) format) is identified, modulus operators for each subframe number (Nsfn), the identified slot numbers in which the PRACH resource is configured, the starting symbol within each slot (e.g., the location of the starting symbol configured for RACH), the number of PRACH slots that are within a 60 KHz slot, and the number of time domain PRACH occasions that are within a RACH slot. In some aspects, configuring a signal to indicate the location and timing pattern for the CFRA resources (e.g., the PRACH resources) may include configuring the signal to identify the PRACH configuration index of table 305.

FIG. 4 illustrates an example of a table 400 that supports signaling to indicate locations of dedicated RACH region in time domain in accordance with aspects of the present disclosure. In some examples, table 400 may implement aspects of wireless communication system 100, CFRA resource configuration 200, and/or table 300. Aspects of table 400 may be implemented by a base station and/or a UE, which may be examples of the corresponding devices described herein.

Generally, table 400 illustrates one example of a technique that may be used to signal a RACH mask in accordance with various aspects of the described techniques. In some aspects, the table 400 includes a first column indicating a RACH mask index (e.g., a valid subframe number (SFN) configuration index) that can be used to indicate each possible time location (e.g., location) within a radio frame (e.g., the location of the CFRA resource) and also a set of valid radio frames (e.g., the timing pattern associated with the pattern of subsequent instances of the time region, or radio frame, in which the CFRA resource is repeated). The set of valid radio frames may be configured from one of the entries illustrated in table 400. In some aspects, the entries of table 400 may be obtained from the superset of valid SFNs used for RACH configurations (e.g., for FR1 and/or FR2 RACH configurations). This may allow the network to configure CFRA resources in any time location within the radio frame and reduce RACH handover latency.

In contrast, other configurations may constrain the network to configure CFRA preambles (e.g., CFRA resources) only with the CBRA occasions within each RACH configuration period. Accordingly, the UE can retransmit CFRA only after one RACH configuration period, which may be as high as 160 ms. Instead, table 400 illustrates an example that would allow the network to configure one or more CFRA opportunities in every radio frame while using a longer RACH configuration period for CBRA purposes.

In some aspects, the entries in table 400 may be signaled using fourteen bits, e.g., conveying (280*6) options for FDD/TDD in FR1 and conveying (1120*6) options for TDD in FR2. This would give the base station higher flexibility to configure CFRA resources to reduce handover latency and would allow the network to configure CFRA retransmission opportunities in every radio frame while using a longer RACH configuration period for CBRA purposes.

In some aspects, the network may indicate (e.g., via a signal generated and transmitted by the base station) the symbol index within a radio frame and a valid SFN configuration index. The UE may deduce a RACH occasion (e.g., the location of the CFRA resource) within the radio frame (e.g., time region) using the symbol index. The UE uses the valid SFN configuration index and a look up table to find the set of valid radio frames (e.g., the timing pattern for subsequent instances of the time region where the CFRA resource is repeated).

Figure 5:
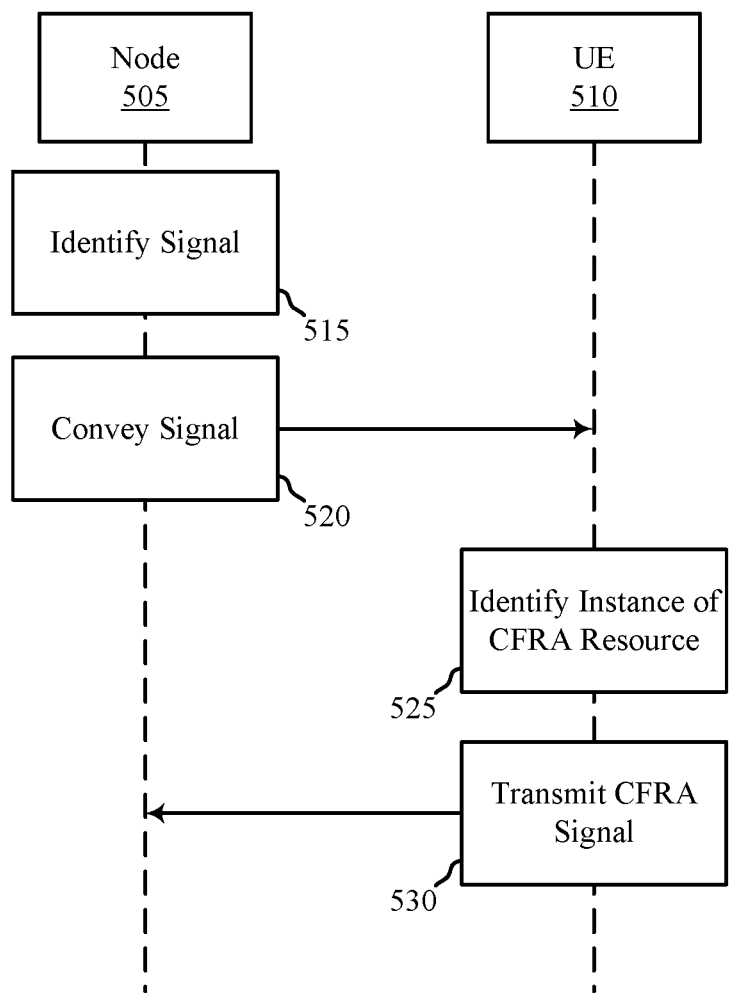
FIG. 5 illustrates an example of a process that supports signaling to indicate locations of dedicated RACH region in time domain in accordance with aspects of the present disclosure.

FIG. 5 illustrates an example of a process 500 that supports signaling to indicate locations of dedicated RACH region in time domain in accordance with aspects of the present disclosure. In some examples, process 500 may implement aspects of wireless communication system 100, CFRA resource configuration 200, and/or tables 300/400. In some aspects, process 500 may include a node 505 and the UE 510, which may be examples of the corresponding devices described herein. In some examples, the node 505 may be a base station or a network entity.

At 515, node 505 may identify signal that provides an indication of the location of the CFRA resource within a time region. The signal may also provide an indication of a timing pattern for the CFRA resource (e.g., the timing pattern may indicate a pattern of subsequent instances of the time region in which the CFRA resources repeated). In some aspects, the CFRA resource is not fully overlapping (e.g., partially overlapping) with respect to a resource for a CBRA procedure.

In some aspects, this may include node 505 identifying one or more symbols within the time region in which the CFRA resource will occur. The location may be based on the one or more symbols. In some examples, the location may include a starting symbol of the CFRA resource. In some aspects, this may include node 505 identifying a subset of time regions from a set of time regions, with each time region within the subset of time regions including one or more instances of the CFRA resource. The timing pattern may be based on the subset of time regions.

In some aspects, the location of the CFRA resource may refer to or otherwise include at least one symbol within the slot, a slot within a subframe, a subframe within a radio frame, and/or a radio frame within a set of radio frames. In some aspects, the CFRA resource may be associated with a time-frequency region, which may also be referred to as a RACH occasion. In some aspects, the time region may include a radio frame, a subframe, a slot, or a mini slot. In some aspects, the timing pattern may be periodic or aperiodic.

At 520, node 505 may transmit (and UE 510 may receive) the signal that indicates the location and the timing pattern. In some aspects, this may include node 505 configuring the signal to convey an indication of a PRACH configuration index to provide the indication of the location of the CFRA resource and/or of the timing pattern.

At 525, UE 510 may identify, based on the location and a timing pattern, at least one instance of the CFRA resource. In some aspects, this may include UE 510 identifying, based on the signal, one or more symbols within the time region in which the CFRA resource will occur. The instance of the CFR resource may be identified based on the one or more symbols. In some examples, the instance may refer to a starting symbol of the CFRA resource.

In some aspects, this may include UE 510 identifying, based at least in part on the signal, a subset of time regions from a set of time regions, with each time region within the subset of time regions including one or more instances of the CFRA resource. UE 510 may identify the instance of the CFRA resource based at least in part on the subset of time regions. In some aspects, this may include UE 510 decoding the signal to identify an indication of a PRACH configuration index that provides the indication of the location of the CFRA resource and/or the timing pattern.

At 530, UE 510 may transmit (and node 505 may receive) a CFRA signal using the identified CFRA resource. In some aspects, this may include node 505 receiving, during at least one instance of the CFRA resource within the time region, a RACH transmission using the CFRA resource. In some examples, the signal may be communicated using a first radio frequency spectrum band that is different from a second radio frequency spectrum band used to convey the RACH transmission. In some examples, the signal may be communicated using a first radio access technology (RAT) that is different from a second RAT used to convey the RACH transmission.

In some aspects, node 505 may be a base station that identifies and conveys a signal to UE 510. In other aspects, node 505 may be a network entity that obtains the signal from a target cell and conveys a signal to a serving cell of the UE 510, e.g., in a handover scenario. The serving cell may then relay the signal to UE 510.

Figure 6:
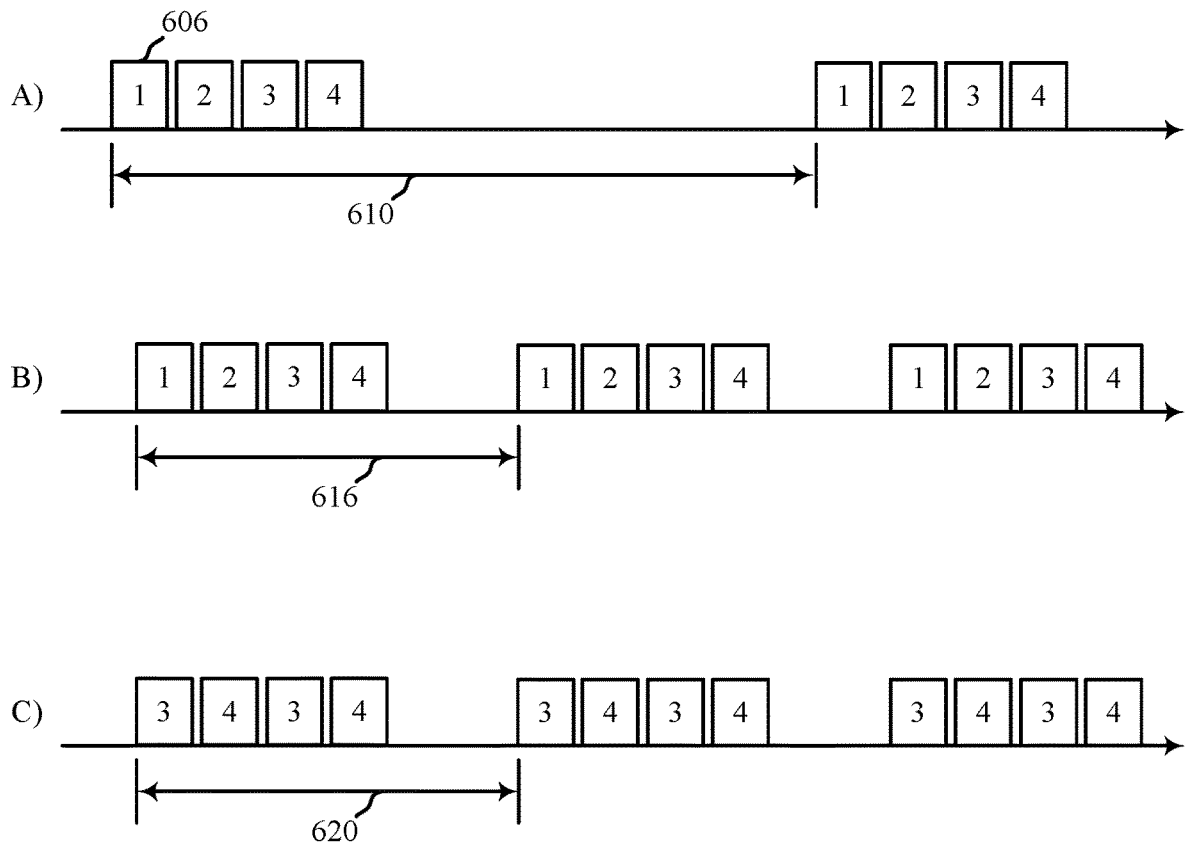
FIG. 6 illustrates an example of a resource configuration that supports signaling to indicate locations of dedicated RACH region in time domain in accordance with aspects of the present disclosure.

FIG. 6 illustrates an example of a resource configuration 600 that supports signaling to indicate locations of dedicated RACH region in time domain in accordance with aspects of the present disclosure. In some examples, resource configuration 600 may implement aspects of wireless communication system 100, CFRA resource configuration 200, tables 300/400, and/or process 500. Aspects of resource configuration 600 may be implemented by a base station and/or a UE, which may be examples of the corresponding devices described herein. Generally, resource configuration 600 illustrates examples of configuring CFRA resources based on SSB occasions 605.

Broadly, resource configuration 600 illustrates another example of signaling resource information in a wireless communication system. In particular, resource configuration 600 illustrates three examples (identified as examples A), B), and C)) of resource configurations. Resource configuration 600 illustrates another way to configure dedicated PRACH resources by configuring a PRACH configuration index (prach-ConfigurationIndex) differently between CBRA and CFRA. This will allow the network to configure PRACH configurations with different periodicities between CBRA and CFRA.

In a first scenario (labeled as example A)), there may be four SSB occasions 605 that are actually associated with SSB transmissions to a UE. The four SSB occasions 605 are labeled as SSB occasions #1 to #4. However, the network may configure CBRA resources in the first scenario, where the SSB occasions 605 that correspond to the actual SSB transmissions occur once per RACH configuration period 610. Accordingly, the CBRA RACH occasion for the UE may correspond to the SSB occasions 605 occurring within the RACH configuration period 610.

In a second scenario (labeled as example B)), there may be four SSB occasions 605 that are actually associated with SSB transmissions to a UE. The four SSB occasions 605 are labeled as SSB occasions #1 to #4. However, the network may configure CFRA resources in the second scenario, where the SSB occasions 605 that correspond to actual SSB transmissions occur one per RACH configuration period 615. Accordingly, the CFRA RACH occasion for the UE may correspond to the SSB occasions 605 occurring with the RACH configuration period 615. In some aspects, the CBRA occasions within RACH configuration period 610 do not overlap (at least not completely) with respect to the CFRA occasions within RACH configuration period 615.

However, in some aspects the network may not configure a UE with CFRA resources for all of its actually transmitted SSB occasions 605. Hence, the PRACH configuration index (prach-ConfigurationIndex) that is configured for CFRA may not need to hold RACH occasions for all actually transmitted SSBs. Instead, the network should be able to configure a different set of actually transmitted SSBs for CFRA so that the UE can find RACH resources more frequently, e.g., for initial RACH msg1 transmission and subsequent retransmission(s) within a RACH configuration period 620. The third scenario (labeled as example C)) illustrates aspects of this and generally illustrates an example where, for CFRA resources, the network is allowed to configure a different set of actually transmitted SSBs to UEs. Aspects of this may be achieved by including an ssb-PositionInBurst information element (IE) within a RACH-configGeneric IE.

Accordingly, a node (e.g., either a base station or network entity) may identify the set of SSB occasions 605. The set may include all SSB occasions that occur within a PRACH configuration period. The node may generate or otherwise identify a signal that provides an indication of the number of transmitted SSBs and an indication of a CFRA resource corresponding to the number of transmitted SSBs (e.g., from the actually transmitted SSBs). The CFRA resource may include a subset of the SSB occasions 605 (e.g., SSB occasions #3 and #4) that occur within the timing window (e.g., the PRACH configuration period 620). In some aspects, this may include multiple instances of the same SSB occasion (e.g., two instances of SSB occasion #3 and two instances of SSB occasion #4) within the timing window. As discussed with reference to the first and second scenario, the CFRA resources may not overlap (at least not completely) with the CBRA resources. The node may transmit the signal to the UE to convey the indication of the CFRA resources.

The UE may receive the signal and identify one or more of the instances of the SSB occasions 605 occurring within the timing window (e.g., the corresponding CFRA resource). The UE may use this CFRA resource to transmit RACH signals (e.g., CFRA signals). In some aspects, multiple instances of the SSB occasions may provide a mechanism where the UE can transmit, and then retransmit, the RACH signal during the timing window. For example, the UE may transmit a first RACH signal (e.g., a RACH preamble) during the first instance of the SSB occasion #3 (or #4) and then retransmit the first RACH signal during the second instance of the SSB occasion #3 (or #4), as configured by the network. This may reduce latency during the RACH procedure between the UE and a base station.

In some aspects, the network may configure the RACH configuration index for a UE, which provides the time location of RACH resources, e.g., for CBRA and Beam failure recovery (BFR)-CFRA, a handover scenario, and the like. The network may convey the SSB index, which would allow the UE to find the appropriate beam for RACH. The network will also convey the CFRA preamble and a relative RACH occasion index. Since one SSB can be mapped to up to eight possible RACH occasions, the relative RACH occasion index identifies which relative RACH occasion contains the dedicated preamble for RACH. In some aspects, the network may signal the SSB index that allows the UE to find the set of relative RACH occasions. This may include an indication that one SSB index is conveyed to find beam and the other SSB index is conveyed to find the location. The network may also signal a new set of actually transmitted SSBs to allow the UE to find a new mapping pattern from SSBs to RACH. This new mapping pattern may provide the indication of the multiple instances of the SSB occasions that occur within the timing window.

Figure 7:
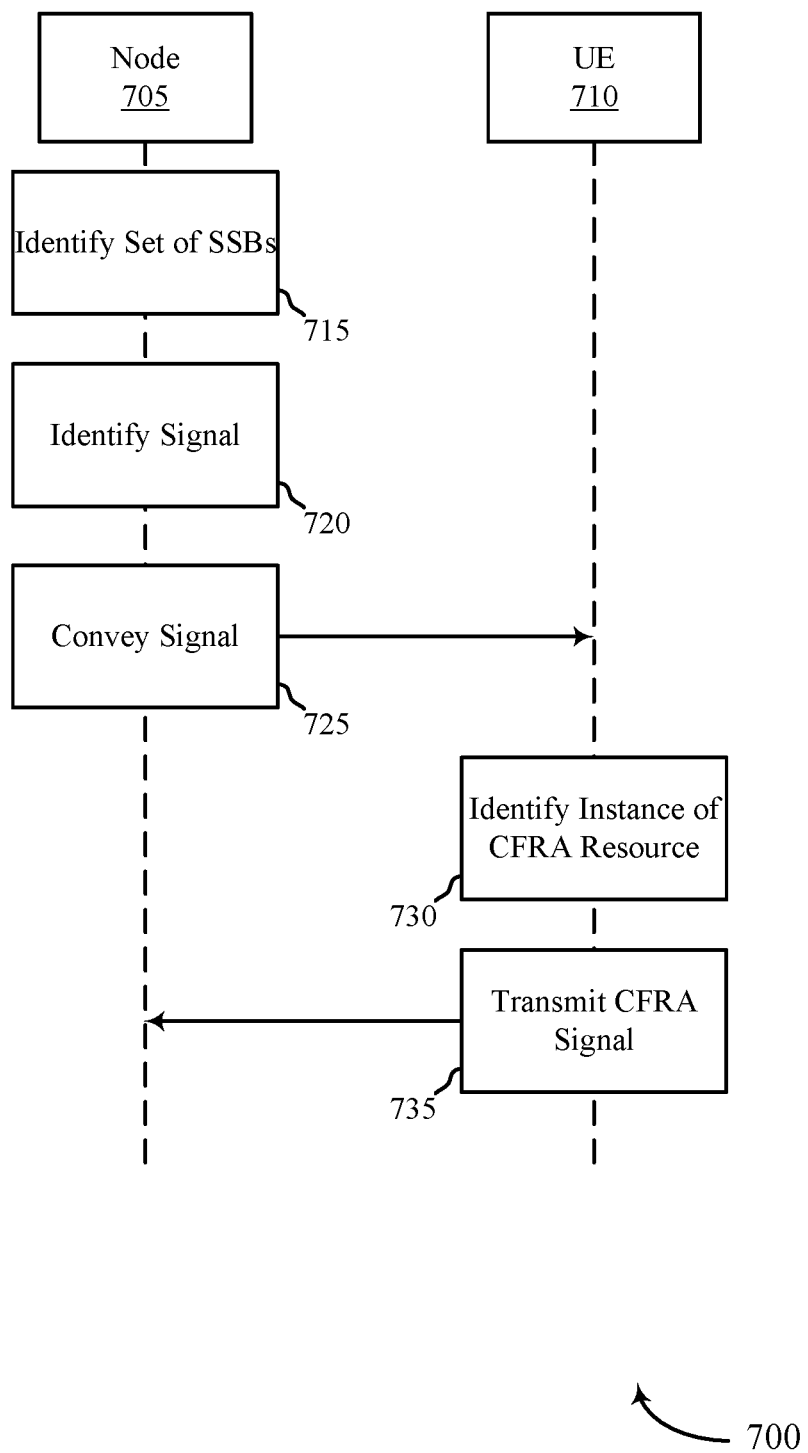
FIG. 7 illustrates an example of a process that supports signaling to indicate locations of dedicated RACH region in time domain in accordance with aspects of the present disclosure.

FIG. 7 illustrates an example of a process 700 that supports signaling to indicate locations of dedicated RACH region in time domain in accordance with aspects of the present disclosure. In some examples, process 700 may implement aspects of wireless communication system 100, CFRA resource configuration 200, tables 300/400, process 500, and/or resource configuration 600. In some aspects, process 700 may include a node 705 and the UE 710, which may be examples of the corresponding devices described herein. In some examples, the node 705 may be a base station or a network entity.

At 715, node 705 may identify a set of SSB occasions. In some aspects, the set of SSB occasions may include configured time-frequency resources associated with SSB transmissions.

At 720, node 705 may identify, for a UE 710, a signal that provides an indication of a number of transmitted SSBs. The signal may also provide an indication of a CFRA resource that corresponds to the number of transmitted SSBs. In some aspects, the CFRA resources is not a fully overlapping resource with respect to a CBRA resource. In some aspects, the number of transmitted SSBs configured for the CFRA resource may be different from the configuration of SSBs associated with a CBRA resource. In some aspects, this may include node 705 identifying a first timing pattern that is associated with CBRA resources, and then configuring the second timing pattern for the CFRA resources that does not overlap the first timing pattern (at least not completely).

In some aspects, this may include node 705 determining a detected number of SSBs by UE 710 and selecting the number of transmitted SSBs based on the detected number of SSBs. For example, node 705 may receive an indication of the detected number of SSBs by UE 710 directly from UE 710 (e.g., in an earlier feedback report) and/or from a network entity. In some aspects, the location of the CFRA resource may include a symbol within the slot, a slot within the subframe, a subframe within a radio frame, and/or a radio frame within a set of radio frames. In some aspects, a timing window associated with the CFRA resource may refer to a frame, a subframe, a slot, or a mini slot, and/or a RACH configuration period.

At 725, node 705 may convey (and UE 710 may receive) the signal. In some aspects, this may include node 705 configuring the signal to provide an indication of an SSB index. The SSB index may provide an indication of a specific rat occasion for a CFRA transmission within a subset of rat occasions.

At 730, UE 710 may identify, based at least in part on the signal, one or more instances of the CFRA resource.

At 735, UE 710 may transmit (and node 705 may receive) a CFRA signal using the identified CFRA resource. In some aspects, this may include node 705 receiving a RACH transmission from UE 710 during at least one instance of the CFRA resource that occurs within the timing window. In some aspects, node 705 may be a base station that identifies a signal and conveys a signal to UE 710. In other aspects, node 705 may be a network entity that obtains a signal from a target cell and conveys a signal to a serving cell of UE 710, e.g., in a handover scenario. The serving cell in the scenario may relay the signal to the UE 710.

In some aspects, node 705 may be a base station that identifies and conveys a signal to UE 710. In other aspects, node 705 may be a network entity that obtains the signal from a target cell and conveys a signal to a serving cell of the UE 710, e.g., in a handover scenario. The serving cell may then relay the signal to UE 710.

Figure 8:
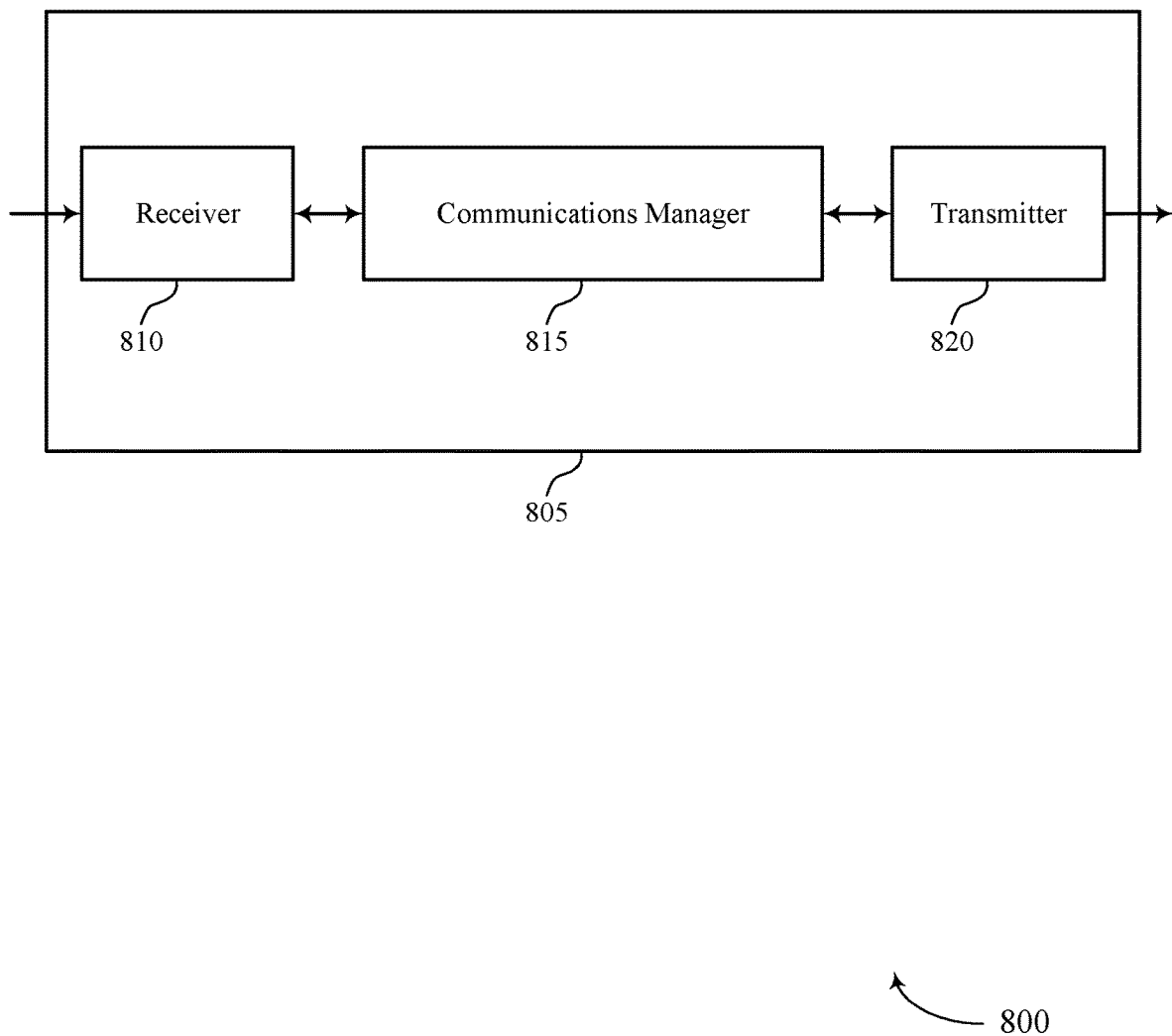
FIGS. 8 and 9 show block diagrams of devices that support signaling to indicate locations of dedicated RACH region in time domain in accordance with aspects of the present disclosure.

FIG. 8 shows a block diagram 800 of a device 805 that supports signaling to indicate locations of dedicated RACH region in time domain in accordance with aspects of the present disclosure. The device 805 may be an example of aspects of a UE 115 as described herein. The device 805 may include a receiver 810, a communications manager 815, and a transmitter 820. The device 805 may also include a processor. Each of these components may be in communication with one another (e.g., via one or more buses).

The receiver 810 may receive information such as packets, user data, or control information associated with various information channels (e.g., control channels, data channels, and information related to signaling to indicate locations of dedicated RACH region in time domain, etc.). Information may be passed on to other components of the device 805. The receiver 810 may be an example of aspects of the transceiver 1120 described with reference to FIG. 11. The receiver 810 may utilize a single antenna or a set of antennas.

The communications manager 815 may receive a signal that conveys an indication of a location of a CFRA resource within a time region, where the CFRA resource is not a fully overlapping resource with respect to a CBRA resource, identify, based on the location, at least one instance of the CFRA resource, and transmit a CFRA signal using the identified instance of the CFRA resource. The communications manager 815 may also receive a signal that provides an indication of a number of transmitted SBs and a CFRA resource corresponding to the number of SSBs, where the number of transmitted SSBs configured for the CFRA resource is different from a configuration of SSBs associated with a CBRA resource, one or more of instances of the CFRA resource, and transmit a CFRA signal using the identified CFRA resource. The communications manager 815 may be an example of aspects of the communications manager 1110 described herein.

The communications manager 815, or its sub-components, may be implemented in hardware, code (e.g., software or firmware) executed by a processor, or any combination thereof. If implemented in code executed by a processor, the functions of the communications manager 815, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 815, or its sub-components, may be physically located at various positions, including being distributed such that portions of functions are implemented at different physical locations by one or more physical components. In some examples, the communications manager 815, or its sub-components, may be a separate and distinct component in accordance with various aspects of the present disclosure. In some examples, the communications manager 815, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 820 may transmit signals generated by other components of the device 805. In some examples, the transmitter 820 may be collocated with a receiver 810 in a transceiver module. For example, the transmitter 820 may be an example of aspects of the transceiver 1120 described with reference to FIG. 11. The transmitter 820 may utilize a single antenna or a set of antennas.

Figure 9:
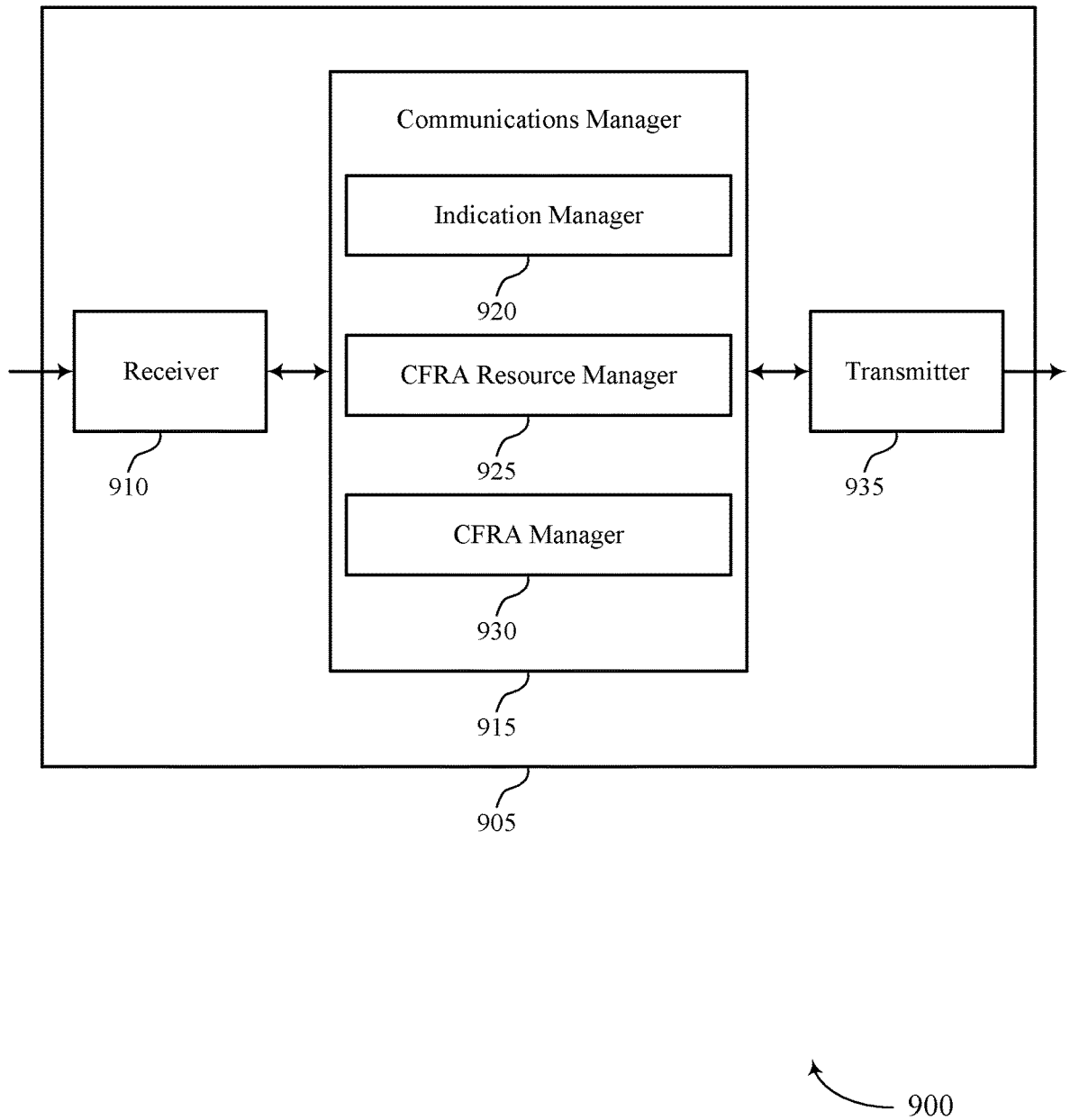

FIG. 9 shows a block diagram 900 of a device 905 that supports signaling to indicate locations of dedicated RACH region in time domain in accordance with aspects of the present disclosure. The device 905 may be an example of aspects of a device 805 or a UE 115 as described herein. The device 905 may include a receiver 910, a communications manager 915, and a transmitter 935. The device 905 may also include a processor. Each of these components may be in communication with one another (e.g., via one or more buses).

The receiver 910 may receive information such as packets, user data, or control information associated with various information channels (e.g., control channels, data channels, and information related to signaling to indicate locations of dedicated RACH region in time domain, etc.). Information may be passed on to other components of the device 905. The receiver 910 may be an example of aspects of the transceiver 1120 described with reference to FIG. 11. The receiver 910 may utilize a single antenna or a set of antennas.

The communications manager 915 may be an example of aspects of the communications manager 815 as described herein. The communications manager 915 may include an indication manager 920, a CFRA resource manager 925, and a CFRA manager 930. The communications manager 915 may be an example of aspects of the communications manager 1110 described herein.

The indication manager 920 may receive a signal that conveys an indication of a location of a CFRA resource within a time region, where the CFRA resource is not a fully overlapping resource with respect to a CBRA resource.

The CFRA resource manager 925 may identify, based on the location and the timing pattern, at least one instance of the CFRA resource. The CFRA resource manager 925 may identify the signal that provides an indication of a timing pattern for the CFRA resource, the timing pattern associated with a pattern of subsequent instances of the time region in which the CFRA resource is repeated, wherein the timing pattern comprises at least one of a periodic pattern or an aperiodic pattern and convey the signal to the one or more UE to indicate the timing pattern.

The CFRA manager 930 may transmit a CFRA signal using the identified instance of the CFRA resource.

The indication manager 920 may receive a signal that provides an indication of a number of transmitted SSBs and a CFRA resource corresponding to the number of SSBs, where the CFRA resource is not a fully overlapping resource with respect to a CBRA resource.

The CFRA resource manager 925 may identify, based on the signal, one or more of instances of the CFRA resource.

The CFRA manager 930 may transmit a CFRA signal using the identified CFRA resource.

The transmitter 935 may transmit signals generated by other components of the device 905. In some examples, the transmitter 935 may be collocated with a receiver 910 in a transceiver module. For example, the transmitter 935 may be an example of aspects of the transceiver 1120 described with reference to FIG. 11. The transmitter 935 may utilize a single antenna or a set of antennas.

Figure 10:
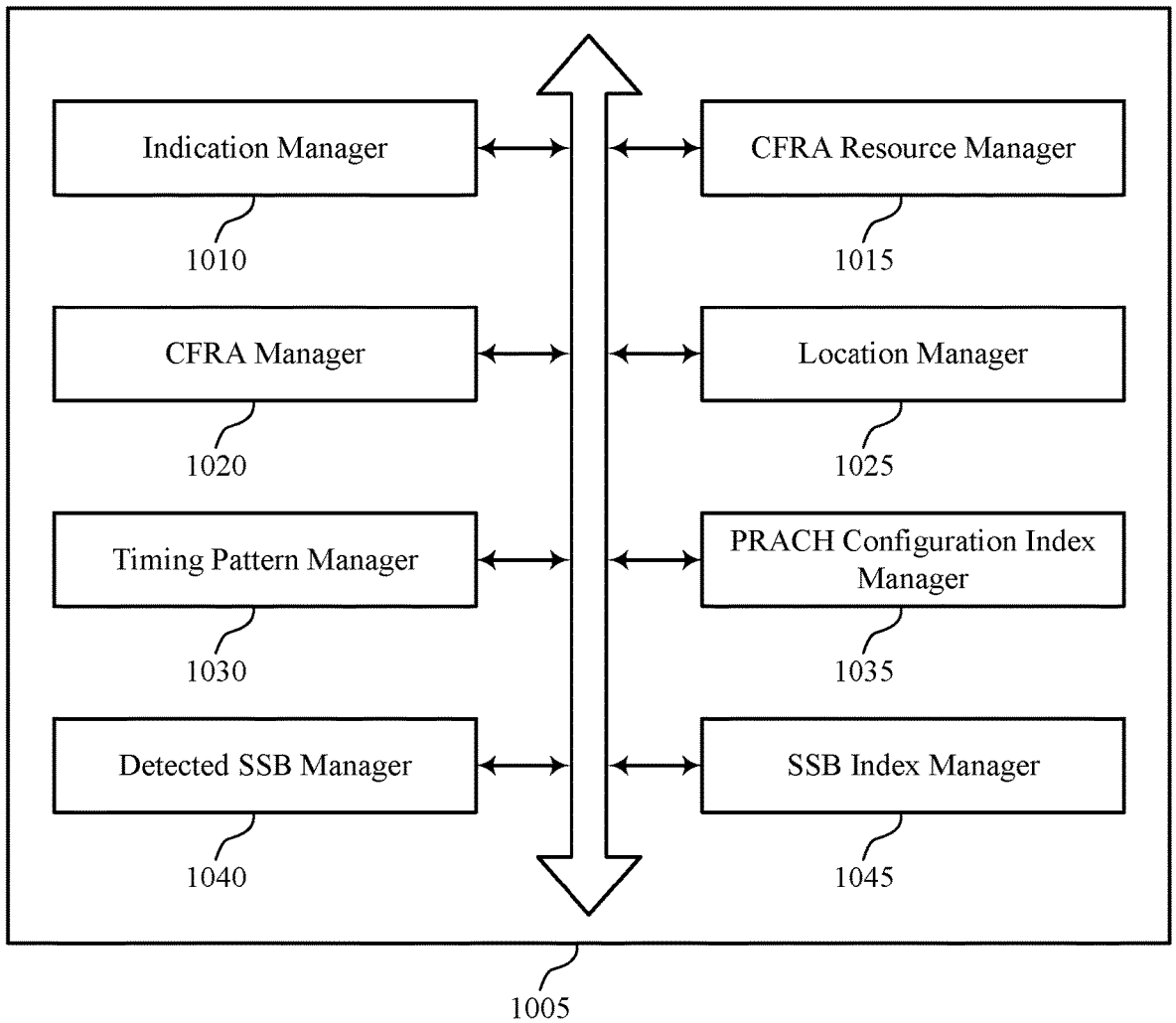
FIG. 10 shows a block diagram of a device that supports signaling to indicate locations of dedicated RACH region in time domain in accordance with aspects of the present disclosure.

FIG. 10 shows a block diagram 1000 of a communications manager 1005 that supports signaling to indicate locations of dedicated RACH region in time domain in accordance with aspects of the present disclosure. The communications manager 1005 may be an example of aspects of a communications manager 815, a communications manager 915, or a communications manager 1110 described herein. The communications manager 1005 may include an indication manager 1010, a CFRA resource manager 1015, a CFRA manager 1020, a location manager 1025, a timing pattern manager 1030, a PRACH configuration index manager 1035, a detected SSB manager 1040, and a SSB index manager 1045. Each of these modules may communicate, directly or indirectly, with one another (e.g., via one or more buses).

The indication manager 1010 may receive a signal that conveys an indication of a location of a CFRA resource within a time region, where the CFRA resource is not a fully overlapping resource with respect to a CBRA resource.

In some examples, the indication manager 1010 may identify the signal that provides an indication of a timing pattern for the CFRA resource, the timing pattern associated with a pattern of subsequent instances of the time region in which the CFRA resource is repeated, wherein the timing pattern comprises at least one of a periodic pattern or an aperiodic pattern and convey the signal to the one or more UE to indicate the timing pattern.

In some examples, the indication manager 1010 may receive a signal that provides an indication of a number of transmitted SSBs and a CFRA resource corresponding to the number of SSBs, where the CFRA resource is not a fully overlapping resource with respect to a CBRA resource.

In some cases, the signal is received in a first radio frequency spectrum band and the CFRA signal is transmitted in a second radio frequency spectrum band, the second radio frequency spectrum band being different from the first radio frequency spectrum band.

In some cases, the signal is received in a first RAT and the CFRA signal is transmitted in a second RAT, the second RAT being different from the first RAT.

The CFRA resource manager 1015 may identify, based on the location and the timing pattern, at least one instance of the CFRA resource.

In some examples, the CFRA resource manager 1015 may identify, based on the signal, one or more of instances of the CFRA resource.

In some examples, the CFRA resource manager 1015 may transmit an indication of the number of transmitted SSBs in an previous feedback report.

In some cases, the location of the CFRA resource includes at least one of a symbol within a slot, or a slot within a subframe, or a subframe within a radio frame, or a radio frame within a set of radio frames, or a combination thereof.

In some cases, the time region includes at least one of a frame, a subframe, a slot, or a mini-slot.

In some cases, a location of the CFRA resource includes at least one of a symbol within a slot, or a slot within a subframe, or a subframe within a radio frame, or a radio frame within a set of radio frames, or a combination thereof.

The CFRA manager 1020 may transmit a CFRA signal using the identified instance of the CFRA resource.

In some examples, the CFRA manager 1020 may transmit a CFRA signal using the identified CFRA resource.

The location manager 1025 may identify, based on the signal, one or more symbols within the time region in which the CFRA resource will occur, where the at least one instance of the CFRA resource is identified based on the one or more symbols.

In some cases, the at least one instance of the CFRA resource occurs at a starting symbol of the CFRA resource.

The timing pattern manager 1030 may identify, based on the signal, a subset of time regions from a set of time regions, each time region within the subset of time regions including one or more instances of the CFRA resource, where the at least one instance of the CFRA resource is identified based on the subset of time regions.

In some cases, the timing pattern includes at least one of a periodic pattern or an aperiodic pattern.

The PRACH configuration index manager 1035 may decode the signal to identify an indication of a PRACH configuration index that provides the indication of at least one of the location of the CFRA resource, or the timing pattern, or a combination thereof.

The detected SSB manager 1040 may monitor, control, or otherwise manage aspects of the number of transmitted SSBs configured for the CFRA resource being different from a configuration of SSBs associated with the CBRA resource.

The SSB index manager 1045 may decode the signal to identify an indication of an SSB index, where the SSB index indicates a specific RACH occasion for a CFRA transmission with a subset of RACH occasions.

Figure 11:
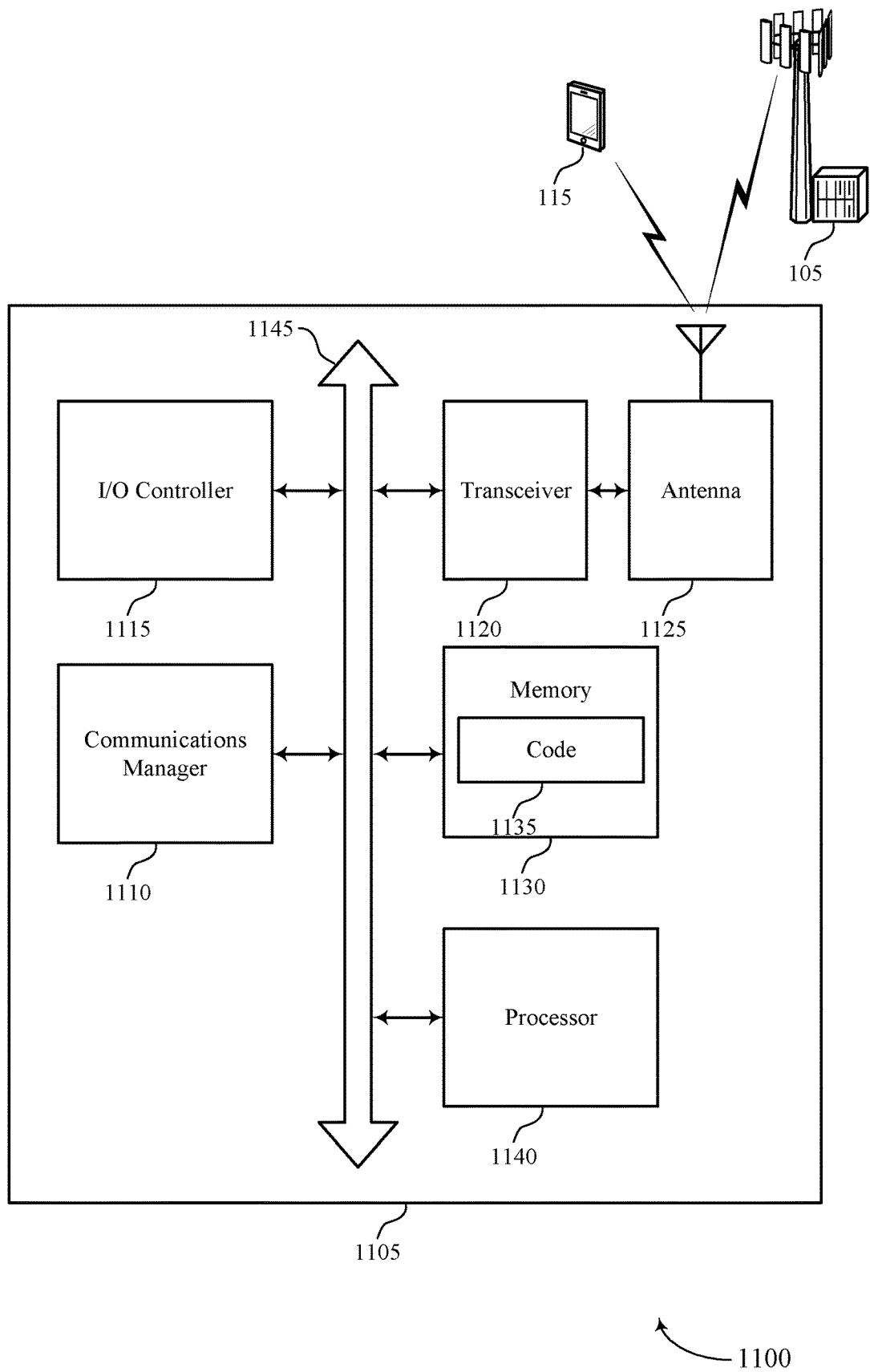
FIG. 11 shows a diagram of a system including a device that supports signaling to indicate locations of dedicated RACH region in time domain in accordance with aspects of the present disclosure.

FIG. 11 shows a diagram of a system 1100 including a device 1105 that supports signaling to indicate locations of dedicated RACH region in time domain in accordance with aspects of the present disclosure. The device 1105 may be an example of or include the components of device 805, device 905, or a UE 115 as described herein. The device 1105 may include components for bi-directional voice and data communications including components for transmitting and receiving communications, including a communications manager 1110, an I/O controller 1115, a transceiver 1120, an antenna 1125, memory 1130, and a processor 1140. These components may be in electronic communication via one or more buses (e.g., bus 1145).

The communications manager 1110 may receive a signal that conveys an indication of a location of a CFRA resource within a time region, where the CFRA resource is not a fully overlapping resource with respect to a CBRA resource, identify, based on the location, at least one instance of the CFRA resource, and transmit a CFRA signal using the identified instance of the CFRA resource. The communications manager 1110 may also receive a signal that provides an indication of a number of transmitted SSBs and a CFRA resource corresponding to the number of SSBs, where the CFRA resource is not a fully overlapping resource with respect to a CBRA resource, identify, based on the signal, one or more of instances of the CFRA resource, and transmit a CFRA signal using the identified CFRA resource.

The I/O controller 1115 may manage input and output signals for the device 1105. The I/O controller 1115 may also manage peripherals not integrated into the device 1105. In some cases, the I/O controller 1115 may represent a physical connection or port to an external peripheral. In some cases, the I/O controller 1115 may utilize an operating system such as iOS®, ANDROID®, MS-DOS®, MS-WINDOWS®, OS/2®, UNIX®, LINUX®, or another known operating system. In other cases, the I/O controller 1115 may represent or interact with a modem, a keyboard, a mouse, a touchscreen, or a similar device. In some cases, the I/O controller 1115 may be implemented as part of a processor. In some cases, a user may interact with the device 1105 via the I/O controller 1115 or via hardware components controlled by the I/O controller 1115.

The transceiver 1120 may communicate bi-directionally, via one or more antennas, wired, or wireless links as described above. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas.

In some cases, the wireless device may include a single antenna 1125. However, in some cases the device may have more than one antenna 1125, which may be capable of concurrently transmitting or receiving multiple wireless transmissions.

The memory 1130 may include RAM and ROM. The memory 1130 may store computer-readable, computer-executable code 1135 including instructions that, when executed, cause the processor to perform various functions described herein. In some cases, the memory 1130 may contain, among other things, a BIOS which may control basic hardware or software operation such as the interaction with peripheral components or devices.

The processor 1140 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting signaling to indicate locations of dedicated RACH region in time domain).

The code 1135 may include instructions to implement aspects of the present disclosure, including instructions to support wireless communications. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein.

Figure 12:
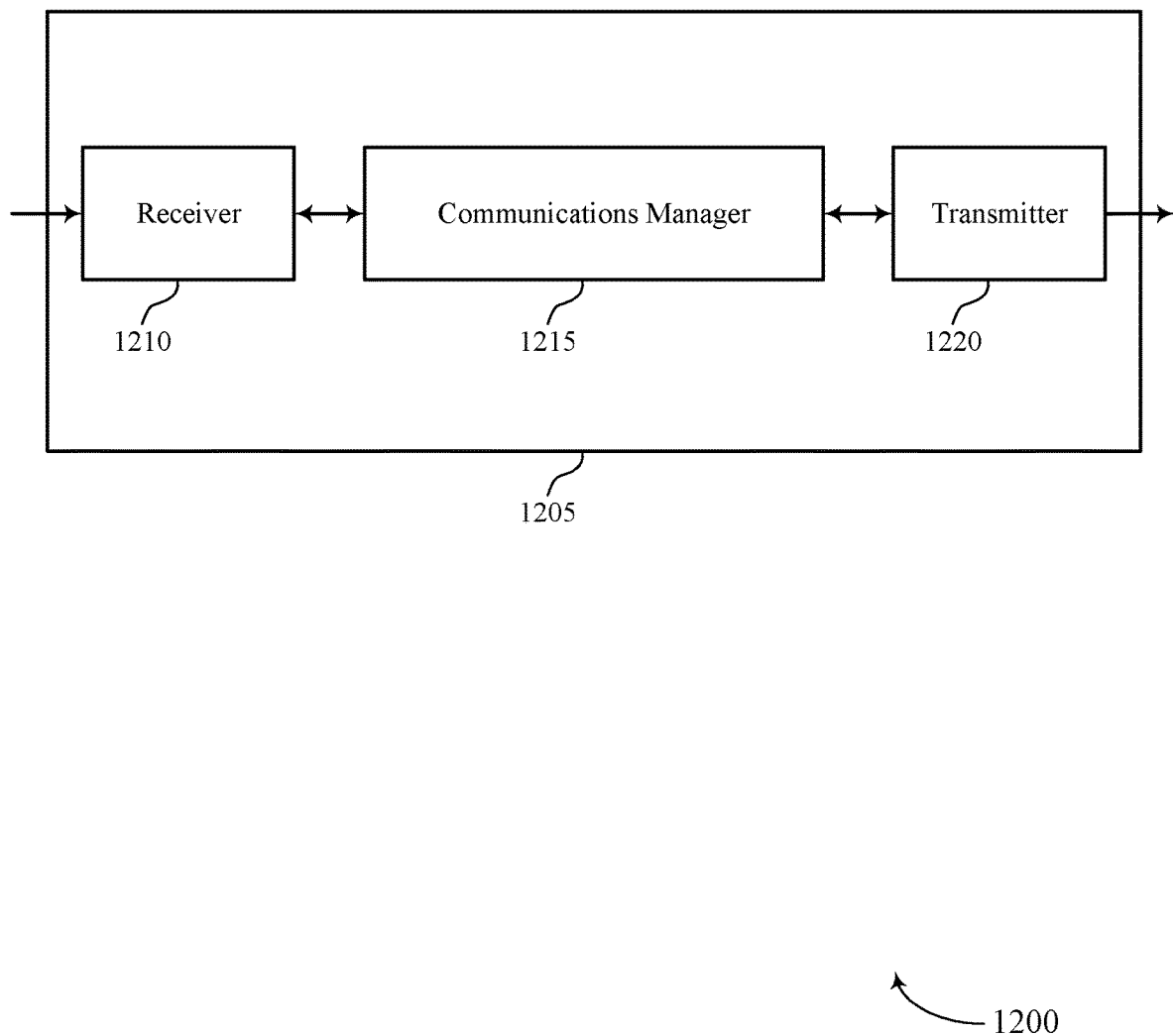
FIGS. 12 and 13 show block diagrams of devices that support signaling to indicate locations of dedicated RACH region in time domain in accordance with aspects of the present disclosure.

FIG. 12 shows a block diagram 1200 of a device 1205 that supports signaling to indicate locations of dedicated RACH region in time domain in accordance with aspects of the present disclosure. The device 1205 may be an example of aspects of a base station 105 as described herein. The device 1205 may include a receiver 1210, a communications manager 1215, and a transmitter 1220. The device 1205 may also include a processor. Each of these components may be in communication with one another (e.g., via one or more buses).

The receiver 1210 may receive information such as packets, user data, or control information associated with various information channels (e.g., control channels, data channels, and information related to signaling to indicate locations of dedicated RACH region in time domain, etc.). Information may be passed on to other components of the device 1205. The receiver 1210 may be an example of aspects of the transceiver 1520 described with reference to FIG. 15. The receiver 1210 may utilize a single antenna or a set of antennas.

The communications manager 1215 may identify a signal that provides an indication of a location of a CFRA resource within a time region and an indication of a timing pattern for the CFRA resource, the timing pattern associated with a pattern of subsequent instances of the time region in which the CFRA resource is repeated, where the CFRA resource is not a fully overlapping resource with respect to a CBRA resource and convey the signal to one or more UE to indicate the location and the timing pattern. The communications manager 1215 may also identify a set of SSB occasions, identify, for a UE, a signal that provides an indication of a number of transmitted SSBs and CFRA resource corresponding to the number of SSBs, where the CFRA resource is a not a fully overlapping resource with respect to a CBRA resource, and convey the signal to the UE to indicate the CFRA resource. The communications manager 1215 may be an example of aspects of the communications manager 1510 described herein.

The communications manager 1215, or its sub-components, may be implemented in hardware, code (e.g., software or firmware) executed by a processor, or any combination thereof. If implemented in code executed by a processor, the functions of the communications manager 1215, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1215, or its sub-components, may be physically located at various positions, including being distributed such that portions of functions are implemented at different physical locations by one or more physical components. In some examples, the communications manager 1215, or its sub-components, may be a separate and distinct component in accordance with various aspects of the present disclosure. In some examples, the communications manager 1215, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1220 may transmit signals generated by other components of the device 1205. In some examples, the transmitter 1220 may be collocated with a receiver 1210 in a transceiver module. For example, the transmitter 1220 may be an example of aspects of the transceiver 1520 described with reference to FIG. 15. The transmitter 1220 may utilize a single antenna or a set of antennas.

Figure 13:
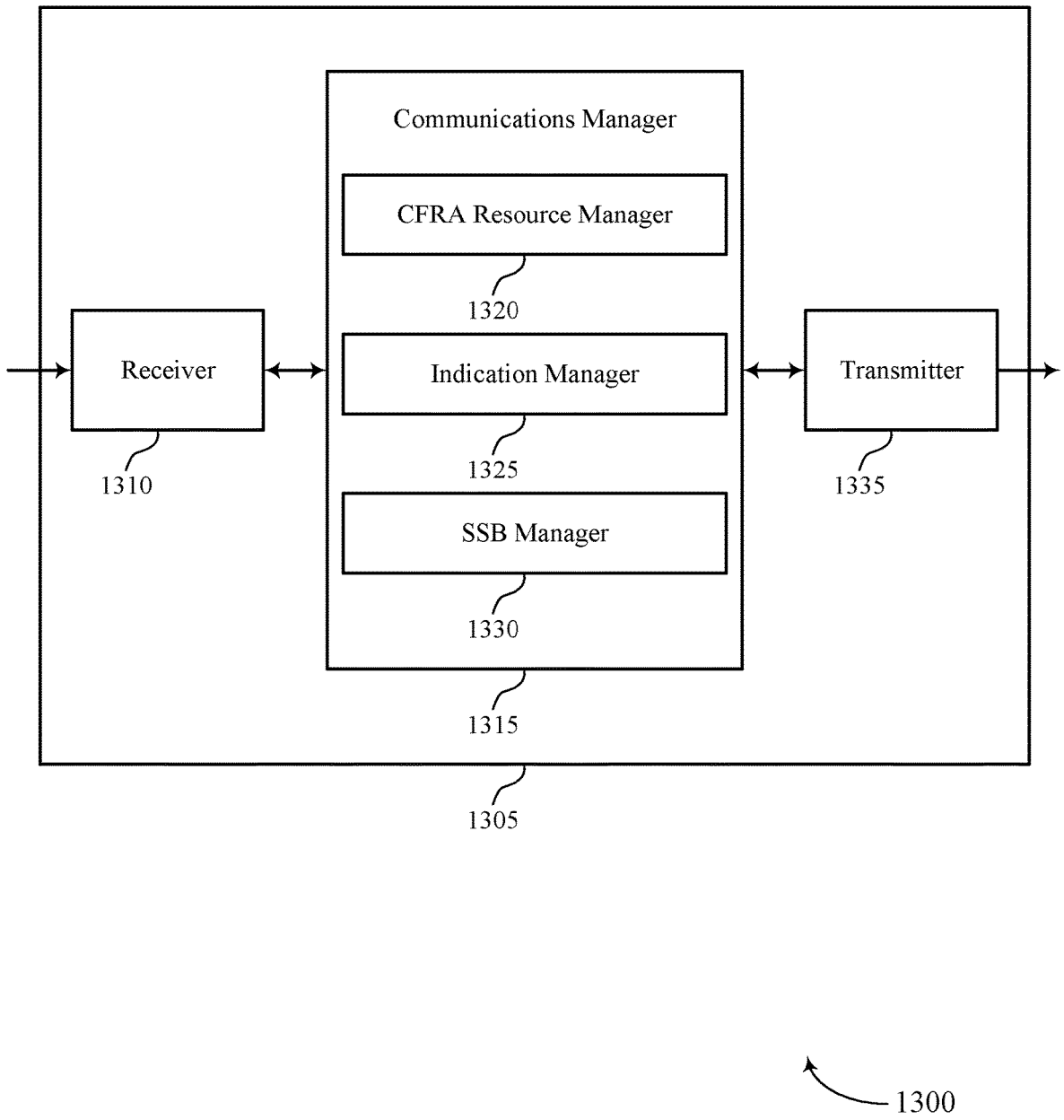

FIG. 13 shows a block diagram 1300 of a device 1305 that supports signaling to indicate locations of dedicated RACH region in time domain in accordance with aspects of the present disclosure. The device 1305 may be an example of aspects of a device 1205 or a base station 115 as described herein. The device 1305 may include a receiver 1310, a communications manager 1315, and a transmitter 1335. The device 1305 may also include a processor. Each of these components may be in communication with one another (e.g., via one or more buses).

The receiver 1310 may receive information such as packets, user data, or control information associated with various information channels (e.g., control channels, data channels, and information related to signaling to indicate locations of dedicated RACH region in time domain, etc.). Information may be passed on to other components of the device 1305. The receiver 1310 may be an example of aspects of the transceiver 1520 described with reference to FIG. 15. The receiver 1310 may utilize a single antenna or a set of antennas.

The communications manager 1315 may be an example of aspects of the communications manager 1215 as described herein. The communications manager 1315 may include a CFRA resource manager 1320, an indication manager 1325, and a SSB manager 1330. The communications manager 1315 may be an example of aspects of the communications manager 1510 described herein.

The CFRA resource manager 1320 may identify a signal that provides an indication of a location of a CFRA resource within a time region and an indication of a timing pattern for the CFRA resource, the timing pattern associated with a pattern of subsequent instances of the time region in which the CFRA resource is repeated, where the CFRA resource is not a fully overlapping resource with respect to a CBRA resource.

The indication manager 1325 may convey the signal to one or more UE to indicate the location and the timing pattern.

The SSB manager 1330 may identify a set of SSB occasions.

The CFRA resource manager 1320 may identify, for a UE, a signal that provides an indication of a number of transmitted SSBs and CFRA resource corresponding to the number of SSBs, where the CFRA resource is a not a fully overlapping resource with respect to a CBRA resource.

The indication manager 1325 may convey the signal to the UE to indicate the CFRA resource.

The transmitter 1335 may transmit signals generated by other components of the device 1305. In some examples, the transmitter 1335 may be collocated with a receiver 1310 in a transceiver module. For example, the transmitter 1335 may be an example of aspects of the transceiver 1520 described with reference to FIG. 15. The transmitter 1335 may utilize a single antenna or a set of antennas.

Figure 14:
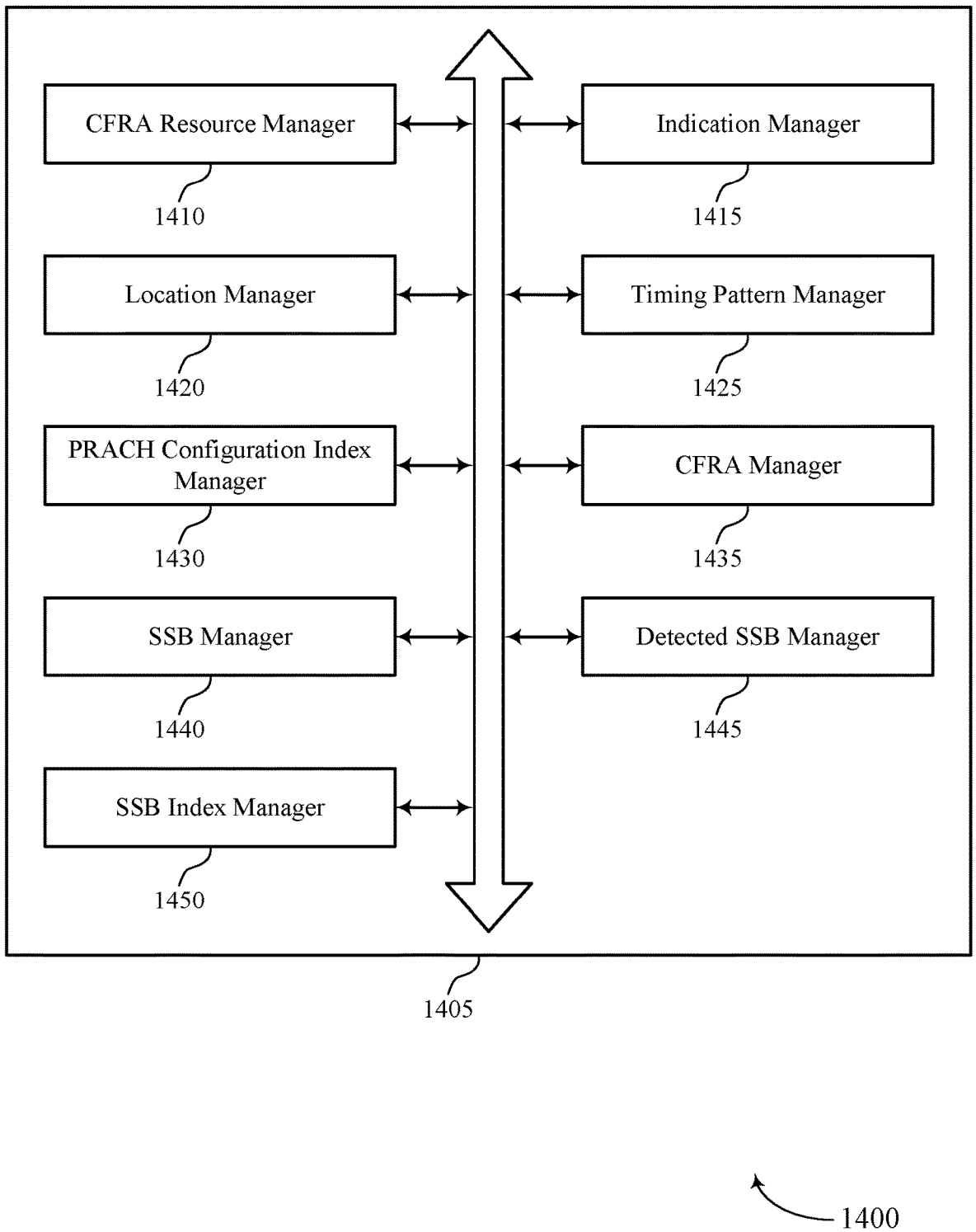
FIG. 14 shows a block diagram of a device that supports signaling to indicate locations of dedicated RACH region in time domain in accordance with aspects of the present disclosure.

FIG. 14 shows a block diagram 1400 of a communications manager 1405 that supports signaling to indicate locations of dedicated RACH region in time domain in accordance with aspects of the present disclosure. The communications manager 1405 may be an example of aspects of a communications manager 1215, a communications manager 1315, or a communications manager 1510 described herein. The communications manager 1405 may include a CFRA resource manager 1410, an indication manager 1415, a location manager 1420, a timing pattern manager 1425, a PRACH configuration index manager 1430, a CFRA manager 1435, a SSB manager 1440, a detected SSB manager 1445, and a SSB index manager 1450. Each of these modules may communicate, directly or indirectly, with one another (e.g., via one or more buses).

The CFRA resource manager 1410 may identify a signal that provides an indication of a location of a CFRA resource within a time region and an indication of a timing pattern for the CFRA resource, the timing pattern associated with a pattern of subsequent instances of the time region in which the CFRA resource is repeated, where the CFRA resource is not a fully overlapping resource with respect to a CBRA resource.

In some examples, the CFRA resource manager 1410 may identify, for a UE, a signal that provides an indication of a number of transmitted SSBs and CFRA resource corresponding to the number of SSBs, where the CFRA resource is a not a fully overlapping resource with respect to a CBRA resource.

In some cases, the location of the CFRA resource includes at least one of a symbol within a slot, or a slot within a subframe, or a subframe within a radio frame, or a radio frame within a set of radio frames, or a combination thereof.

In some cases, the CFRA resource is associated with a time-frequency region, and the CFRA resource may include a RACH occasion.

In some cases, the time region includes at least one of a frame, a subframe, a slot, or a mini-slot.

In some cases, a location of the CFRA resource includes at least one of a symbol within a slot, or a slot within a subframe, or a subframe within a radio frame, or a radio frame within a set of radio frames, or a combination thereof.

The indication manager 1415 may convey the signal to one or more UE to indicate the location and the timing pattern.

In some examples, the indication manager 1415 may convey the signal to the UE to indicate the CFRA resource. In some cases, the node includes a base station, the base station identifying and conveying the signal. In some cases, the node includes a network entity, the network entity obtaining the signal from a target cell and conveying the signal to a serving cell to be relayed to the UE. In some cases, the node includes a base station, the base station identifying and conveying the signal. In some cases, the node includes a network entity, the network entity obtaining the signal from a target cell and conveying the signal to a serving cell to be relayed to the UE.

The SSB manager 1440 may identify a set of SSB occasions. In some cases, the number of transmitted SSBs configured for the CFRA resource is different from a configuration of SSBs associated with the CBRA resource.

The location manager 1420 may identify one or more symbols within the time region in which the CFRA resource will occur, where the location is based on the one or more symbols. In some cases, the location includes a starting symbol of the CFRA resource.

The timing pattern manager 1425 may identify a subset of time regions from a set of time regions, each time region within the subset of time regions including one or more instances of the CFRA resource, where the timing pattern is based on the subset of time regions. In some examples, the timing pattern manager 1425 may identify a first timing pattern associated with the CBRA resources. In some examples, the timing pattern manager 1425 may configure a second timing pattern associated with the CFRA resources, where the second timing pattern does not overlap with the first timing pattern. In some cases, the timing pattern includes at least one of a periodic pattern or an aperiodic pattern. In some cases, the timing window includes at least one of a frame, a subframe, a slot, or a mini-slot.

The PRACH configuration index manager 1430 may configure the signal to convey an indication of a PRACH configuration index to provide the indication of at least one of the location of the CFRA resource, or the timing pattern, or a combination thereof.

The CFRA manager 1435 may receive, during at least one instance of the CFRA resource within the time region, a RACH transmission using the CFRA resource.

In some examples, the CFRA manager 1435 may receive a RACH transmission from the UE during at least one instance of the multiple instances occurring within the timing window. In some cases, the signal is conveyed in a first radio frequency spectrum band and the RACH transmission is received in a second radio frequency spectrum band, the second radio frequency spectrum band being different from the first radio frequency spectrum band. In some cases, the signal is conveyed in a first RAT and the RACH transmission is received in a second RAT, the second RAT being different from the first RAT.

The detected SSB manager 1445 may determine a detected number of SSBs by the UE. In some examples, the detected SSB manager 1445 may select the number of transmitted SSBs based on the detected number of SSBs by the UE. In some examples, the detected SSB manager 1445 may receive an indication of the detected number of SSBs from a network entity.

The SSB index manager 1450 may configure the signal to provide an indication of an SSB index, where the SSB index indicates a specific RACH occasion for a CFRA transmission within a subset of RACH occasions.

Figure 15:
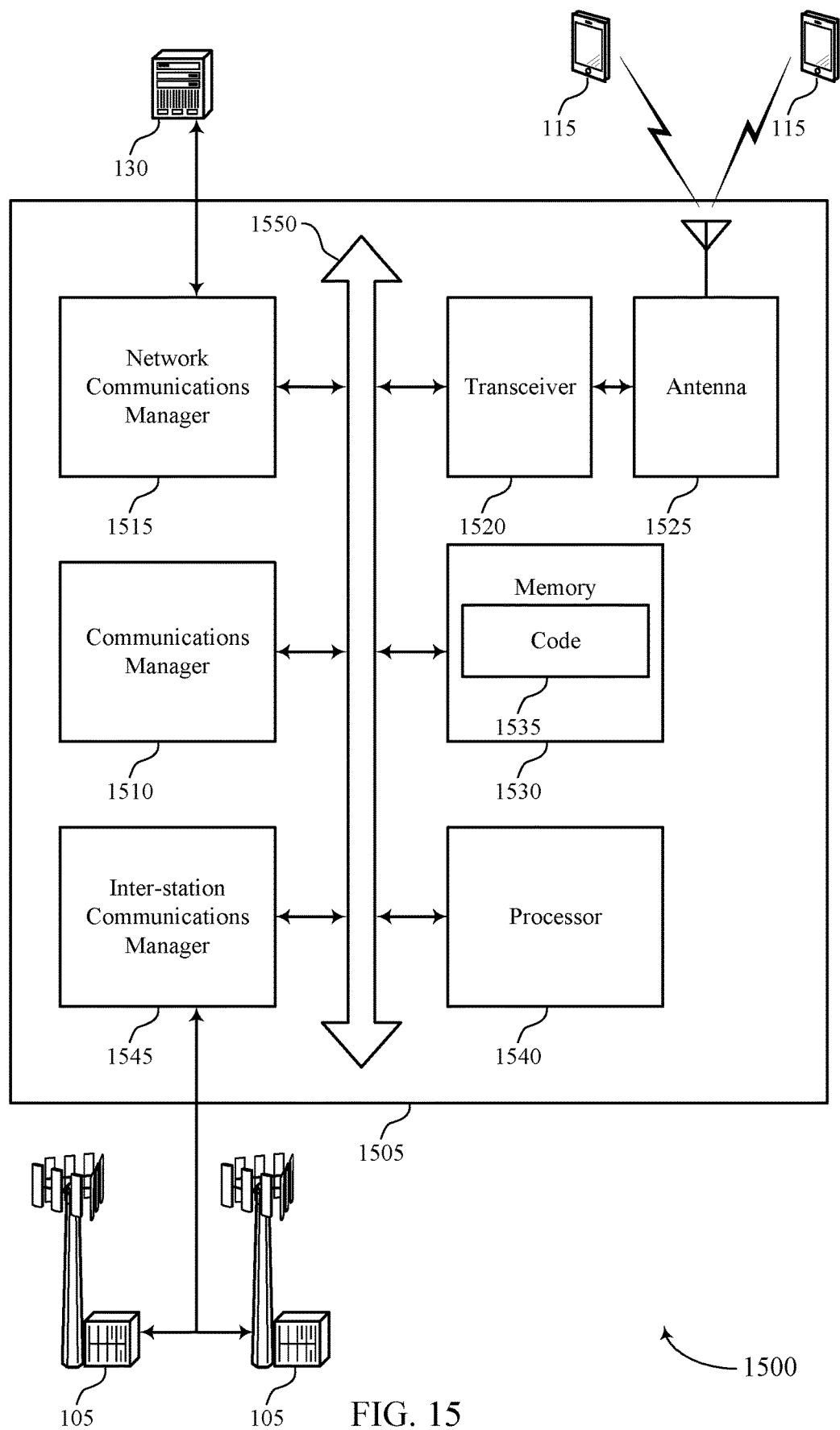
FIG. 15 shows a diagram of a system including a device that supports signaling to indicate locations of dedicated RACH region in time domain in accordance with aspects of the present disclosure.

FIG. 15 shows a diagram of a system 1500 including a device 1505 that supports signaling to indicate locations of dedicated RACH region in time domain in accordance with aspects of the present disclosure. The device 1505 may be an example of or include the components of device 1205, device 1305, or a base station 105 as described herein. The device 1505 may include components for bi-directional voice and data communications including components for transmitting and receiving communications, including a communications manager 1510, a network communications manager 1515, a transceiver 1520, an antenna 1525, memory 1530, a processor 1540, and an inter-station communications manager 1545. These components may be in electronic communication via one or more buses (e.g., bus 1550).

The communications manager 1510 may identify a signal that provides an indication of a location of a CFRA resource within a time region and an indication of a timing pattern for the CFRA resource, the timing pattern associated with a pattern of subsequent instances of the time region in which the CFRA resource is repeated, where the CFRA resource is not a fully overlapping resource with respect to a CBRA resource and convey the signal to one or more UE to indicate the location and the timing pattern. The communications manager 1510 may also identify a set of SSB occasions, identify, for a UE, a signal that provides an indication of a number of transmitted SSBs and CFRA resource corresponding to the number of SSBs, where the CFRA resource is a not a fully overlapping resource with respect to a CBRA resource, and convey the signal to the UE to indicate the CFRA resource.

The network communications manager 1515 may manage communications with the core network (e.g., via one or more wired backhaul links). For example, the network communications manager 1515 may manage the transfer of data communications for client devices, such as one or more UEs 115.

The transceiver 1520 may communicate bi-directionally, via one or more antennas, wired, or wireless links as described above. For example, the transceiver 1520 may represent a wireless transceiver and may communicate bi-directionally with another wireless transceiver. The transceiver 1520 may also include a modem to modulate the packets and provide the modulated packets to the antennas for transmission, and to demodulate packets received from the antennas.

In some cases, the wireless device may include a single antenna 1525. However, in some cases the device may have more than one antenna 1525, which may be capable of concurrently transmitting or receiving multiple wireless transmissions.

The memory 1530 may include RAM, ROM, or a combination thereof. The memory 1530 may store computer-readable code 1535 including instructions that, when executed by a processor (e.g., the processor 1540) cause the device to perform various functions described herein. In some cases, the memory 1530 may contain, among other things, a BIOS which may control basic hardware or software operation such as the interaction with peripheral components or devices.

The processor 1540 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1540 may be configured to operate a memory array using a memory controller. In some cases, a memory controller may be integrated into processor 1540. The processor 1540 may be configured to execute computer-readable instructions stored in a memory (e.g., the memory 1530) to cause the device #{device} to perform various functions (e.g., functions or tasks supporting signaling to indicate locations of dedicated RACH region in time domain).

The inter-station communications manager 1545 may manage communications with other base station 105, and may include a controller or scheduler for controlling communications with UEs 115 in cooperation with other base stations 105. For example, the inter-station communications manager 1545 may coordinate scheduling for transmissions to UEs 115 for various interference mitigation techniques such as beamforming or joint transmission. In some examples, the inter-station communications manager 1545 may provide an X2 interface within an LTE/LTE-A wireless communication network technology to provide communication between base stations 105.

The code 1535 may include instructions to implement aspects of the present disclosure, including instructions to support wireless communications. The code 1535 may be stored in a non-transitory computer-readable medium such as system memory or other type of memory. In some cases, the code 1535 may not be directly executable by the processor 1540 but may cause a computer (e.g., when compiled and executed) to perform functions described herein.

Figure 16:
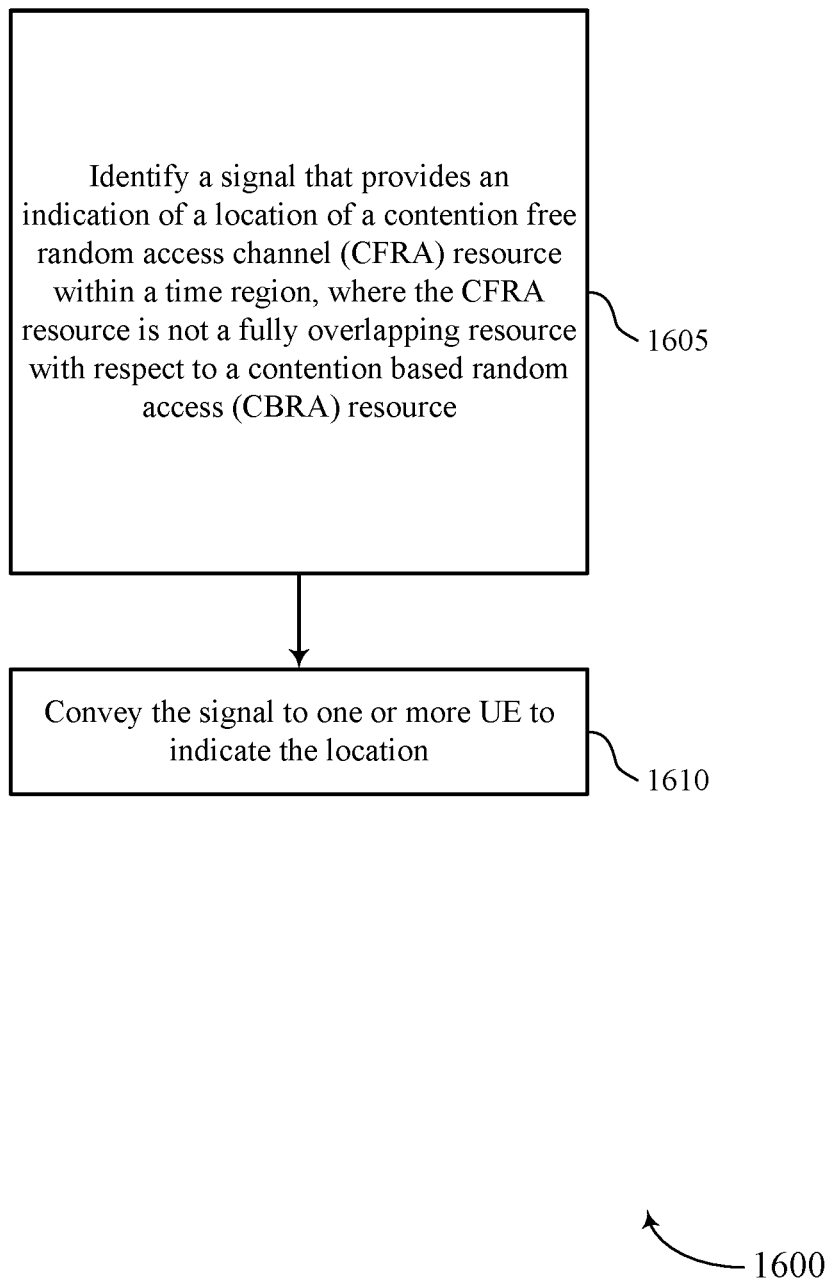
FIGS. 16 through 19 show flowcharts illustrating methods that support signaling to indicate locations of dedicated RACH region in time domain in accordance with aspects of the present disclosure.

FIG. 16 shows a flowchart illustrating a method 1600 that supports signaling to indicate locations of dedicated RACH region in time domain in accordance with aspects of the present disclosure. The operations of method 1600 may be implemented by a base station 105 or its components as described herein. For example, the operations of method 1600 may be performed by a communications manager as described with reference to FIGS. 12 to 15. In some examples, a base station may execute a set of instructions to control the functional elements of the base station to perform the functions described below. Additionally or alternatively, a base station may perform aspects of the functions described below using special-purpose hardware.

At 1605, the base station may identify a signal that provides an indication of a location of a CFRA resource within a time region, where the CFRA resource is not a fully overlapping resource with respect to a CBRA resource. The operations of 1605 may be performed according to the methods described herein. In some examples, aspects of the operations of 1605 may be performed by a CFRA resource manager as described with reference to FIGS. 12 to 15.

At 1610, the base station may convey the signal to one or more UE to indicate the location. The operations of 1610 may be performed according to the methods described herein. In some examples, aspects of the operations of 1610 may be performed by an indication manager as described with reference to FIGS. 12 to 15.

Figure 17:
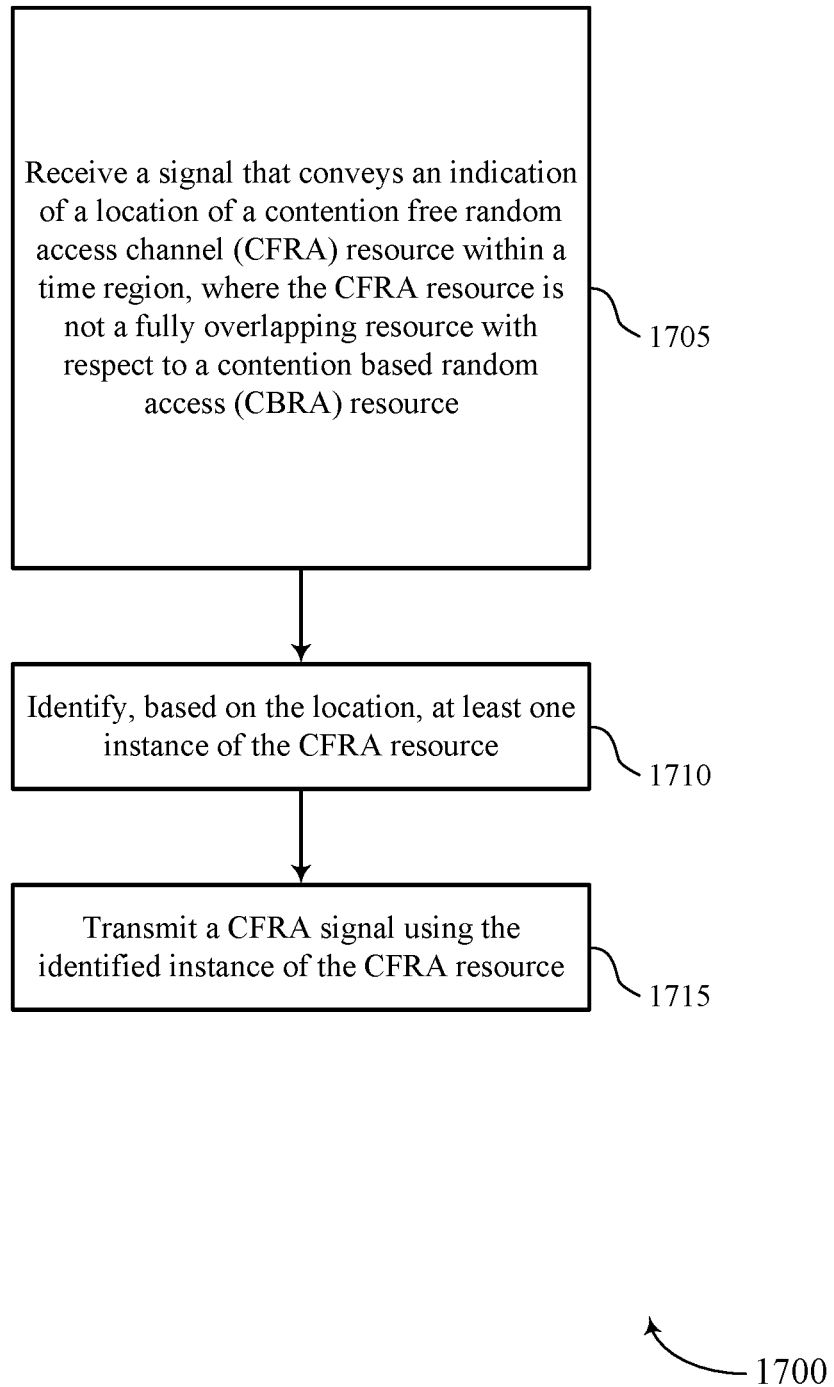

FIG. 17 shows a flowchart illustrating a method 1700 that supports signaling to indicate locations of dedicated RACH region in time domain in accordance with aspects of the present disclosure. The operations of method 1700 may be implemented by a UE 115 or its components as described herein. For example, the operations of method 1700 may be performed by a communications manager as described with reference to FIGS. 8 to 11. In some examples, a UE may execute a set of instructions to control the functional elements of the UE to perform the functions described below. Additionally or alternatively, a UE may perform aspects of the functions described below using special-purpose hardware.

At 1705, the UE may receive a signal that conveys an indication of a location of a CFRA resource within a time region, where the CFRA resource is not a fully overlapping resource with respect to a CBRA resource. The operations of 1705 may be performed according to the methods described herein. In some examples, aspects of the operations of 1705 may be performed by an indication manager as described with reference to FIGS. 8 to 11.

At 1710, the UE may identify, based on the location, at least one instance of the CFRA resource. The operations of 1710 may be performed according to the methods described herein. In some examples, aspects of the operations of 1710 may be performed by a CFRA resource manager as described with reference to FIGS. 8 to 11.

At 1715, the UE may transmit a CFRA signal using the identified instance of the CFRA resource. The operations of 1715 may be performed according to the methods described herein. In some examples, aspects of the operations of 1715 may be performed by a CFRA manager as described with reference to FIGS. 8 to 11.

Figure 18:
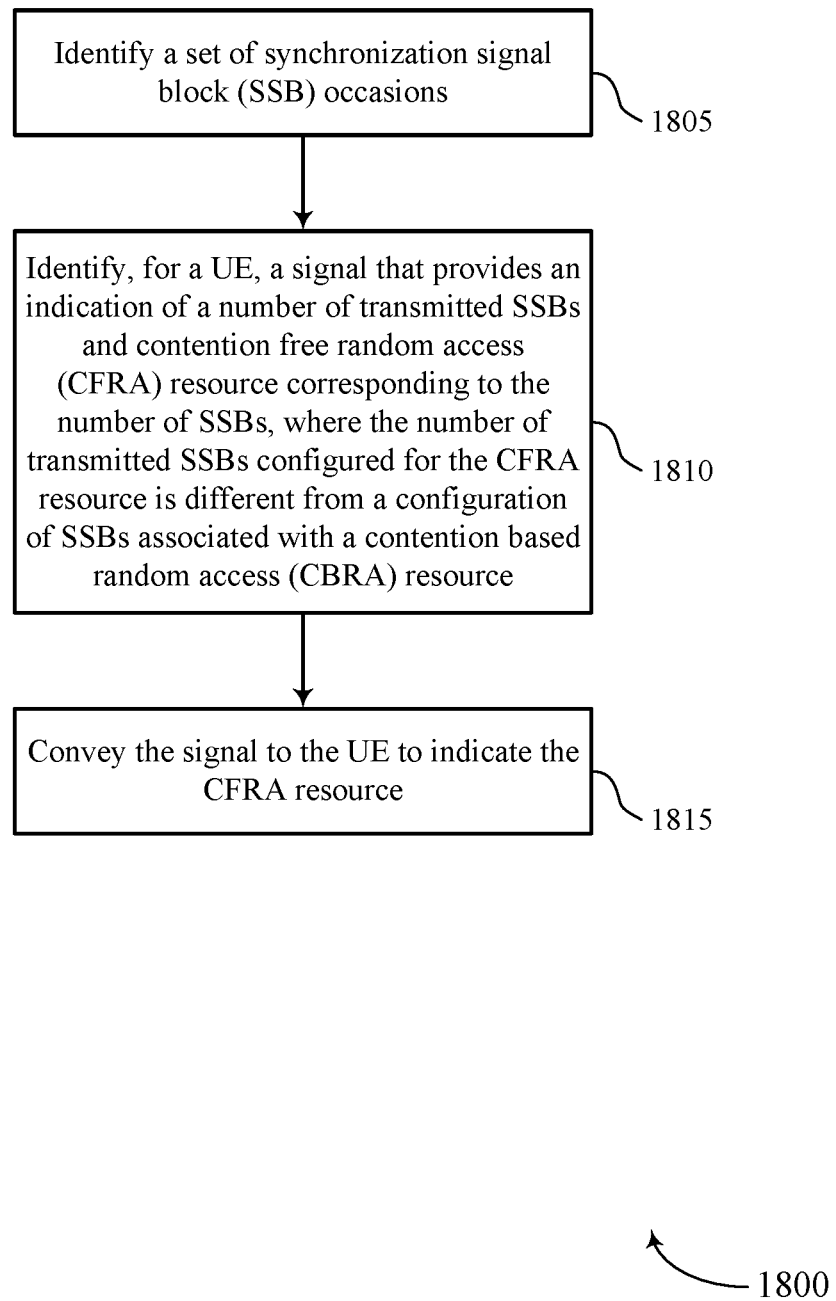

FIG. 18 shows a flowchart illustrating a method 1800 that supports signaling to indicate locations of dedicated RACH region in time domain in accordance with aspects of the present disclosure. The operations of method 1800 may be implemented by a base station 105 or its components as described herein. For example, the operations of method 1800 may be performed by a communications manager as described with reference to FIGS. 12 to 15. In some examples, a base station may execute a set of instructions to control the functional elements of the base station to perform the functions described below. Additionally or alternatively, a base station may perform aspects of the functions described below using special-purpose hardware.

At 1805, the base station may identify a set of SSB occasions. The operations of 1805 may be performed according to the methods described herein. In some examples, aspects of the operations of 1805 may be performed by a SSB manager as described with reference to FIGS. 12 to 15.

At 1810, the base station may identify, for a UE, a signal that provides an indication of a number of transmitted SSBs and CFRA resource corresponding to the number of SSBs, where the number of transmitted SSBs configured for the CFRA resource is different from a configuration of SSBs associated with a CBRA resource. The operations of 1810 may be performed according to the methods described herein. In some examples, aspects of the operations of 1810 may be performed by a CFRA resource manager as described with reference to FIGS. 12 to 15.

At 1815, the base station may convey the signal to the UE to indicate the CFRA resource. The operations of 1815 may be performed according to the methods described herein. In some examples, aspects of the operations of 1815 may be performed by an indication manager as described with reference to FIGS. 12 to 15.

Figure 19:
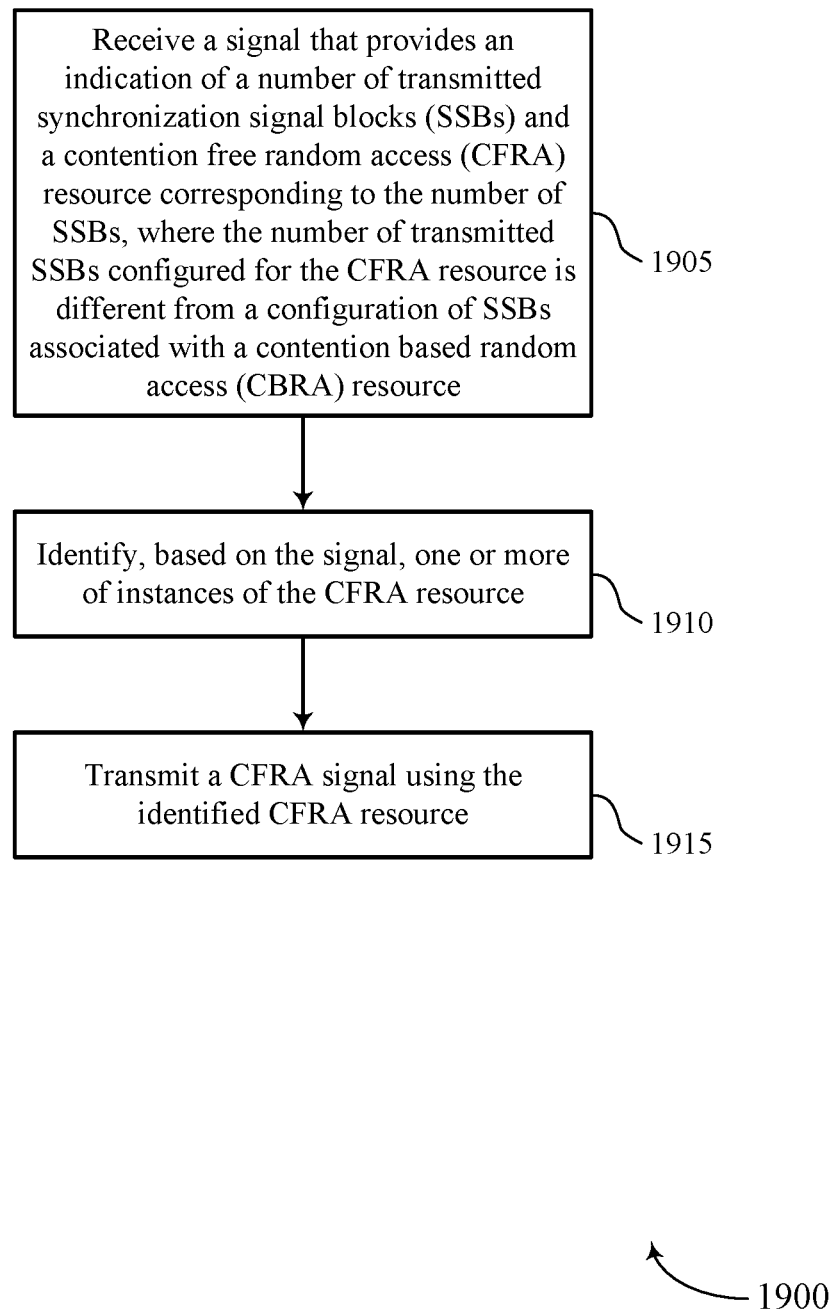

FIG. 19 shows a flowchart illustrating a method 1900 that supports signaling to indicate locations of dedicated RACH region in time domain in accordance with aspects of the present disclosure. The operations of method 1900 may be implemented by a UE 115 or its components as described herein. For example, the operations of method 1900 may be performed by a communications manager as described with reference to FIGS. 8 to 11. In some examples, a UE may execute a set of instructions to control the functional elements of the UE to perform the functions described below. Additionally or alternatively, a UE may perform aspects of the functions described below using special-purpose hardware.

At 1905, the UE may receive a signal that provides an indication of a number of transmitted SSBs and a CFRA resource corresponding to the number of SSBs, where the number of transmitted SSBs configured for the CFRA resource is different from a configuration of SSBs associated with a CBRA resource. The operations of 1905 may be performed according to the methods described herein. In some examples, aspects of the operations of 1905 may be performed by an indication manager as described with reference to FIGS. 8 to 11.

At 1910, the UE may identify, based on the signal, one or more of instances of the CFRA resource. The operations of 1910 may be performed according to the methods described herein. In some examples, aspects of the operations of 1910 may be performed by a CFRA resource manager as described with reference to FIGS. 8 to 11.

At 1915, the UE may transmit a CFRA signal using the identified CFRA resource. The operations of 1915 may be performed according to the methods described herein. In some examples, aspects of the operations of 1915 may be performed by a CFRA manager as described with reference to FIGS. 8 to 11.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a node, comprising:

transmitting, for one or more user equipments (UEs), a signal indicating a location of a contention free random access channel (CFRA) resource within a time region and indicating a number of actually transmitted synchronization signal block (SSB) signals, wherein:

the CFRA resource is based at least in part on the actually transmitted SSB signals and is partially overlapping and not fully overlapping in time with respect to a contention based random access (CBRA) resource, the signal indicates a timing pattern for the CFRA resource via a symbol index within a radio frame and a system frame number configuration index, the timing pattern associated with a pattern of subsequent instances of the time region in which the CFRA resource is repeated, and the signal indicates a physical random access channel (PRACH) configuration index to provide at least one of the location of the CFRA resource, or the indication of the timing pattern for the CFRA resource, or a combination thereof; and determining the timing pattern based at least in part on the symbol index and the system frame number configuration index; and receiving, during at least one instance of the CFRA resource within the time region, a random access channel (RACH) transmission using the CFRA resource.

2. The method of claim 1, wherein the timing pattern comprises an aperiodic pattern.

3. The method of claim 1, further comprising:
identifying one or more symbols within the time region in which the CFRA resource will occur, wherein the location is based at least in part on the one or more symbols.

4. The method of claim 3, wherein the location comprises a starting symbol of the CFRA resource.

5. The method of claim 1, further comprising:
identifying a subset of time regions from a set of time regions, each time region within the subset of time regions comprising one or more instances of the CFRA resource, wherein the timing pattern for the CFRA resource is based at least in part on the subset of time regions.

6. The method of claim 1, wherein:
the signal is transmitted in a first radio frequency spectrum band and the RACH transmission is received in a second radio frequency spectrum band, the second radio frequency spectrum band being different from the first radio frequency spectrum band; or the signal is transmitted via a first radio access technology (RAT) and the RACH transmission is received via a second RAT, the second RAT being different from the first RAT.

7. The method of claim 1, wherein the location of the CFRA resource comprises at least one of a symbol within a slot, or a slot within a subframe, or a subframe within a radio frame, or a radio frame within a set of radio frames, or a combination thereof.

8. The method of claim 1, wherein the CFRA resource is associated with a time-frequency region, and the CFRA resource comprises a RACH occasion.

9. The method of claim 1, wherein the node comprises a network entity, the method further comprising:
obtaining, by the network entity, the signal from a target cell; and
transmitting, by the network entity, the signal to a serving cell to be relayed to the one or more UEs.

10. The method of claim 1, wherein the time region comprises at least one of a frame, a subframe, a slot, or a mini-slot.

11. The method of claim 1, wherein the timing pattern comprises a periodic pattern.

12. The method of claim 1, wherein the PRACH configuration index indicates a corresponding preamble format, one or more modulus operators for each subframe number associated with the CFRA resource, one or more slot numbers in which a physical random access channel (PRACH) resource is configured, a starting symbol within each slot of the time region, and a number of time domain PRACH occasions that are within a RACH slot.

13. The method of claim 1, wherein the timing pattern indicates one or more CFRA resources in every radio frame of the time region.

14. A wireless communication node, comprising:
a processor configured to generate a signal indicating a location of a contention free random access channel (CFRA) resource within a time region and indicating a number of actually transmitted synchronization signal block (SSB) signals, wherein:

the CFRA resource is based at least in part on the actually transmitted SSB signals and is partially overlapping and not fully overlapping in time with respect to a contention based random access (CBRA) resource, the signal indicates a timing pattern for the CFRA resource via a symbol index within a radio frame and a system frame n umber configuration index, the timing pattern associated with a pattern of subsequent instances of the time region in which the CFRA resource is repeated, and the signal indicates a physical random access channel (PRACH) configuration index to provide at least one of the location of the CFRA resource, or the indication of the timing pattern for the CFRA resource, or a combination thereof, and the processor is further configured to determine the timing pattern based at least in part on the symbol index and the system frame number configuration index; and a transmitter configured to transmit, for one or more user equipments (UEs), the signal to indicate the location, the timing pattern, and the time region; and a receiver configured to receive, during at least one instance of the CFRA resource within the time region, a random access channel (RACH) transmission using the CFRA resource.

15. The wireless communication node of claim 14, wherein the timing pattern comprises at least one of a periodic pattern or an aperiodic pattern.

16. The wireless communication node of claim 14, wherein:
the processor is configured to identify one or more symbols within the time region in which the CFRA resource will occur, wherein the location is based at least in part on the one or more symbols.

17. The wireless communication node of claim 16, wherein the location comprises a starting symbol of the CFRA resource.

18. The wireless communication node of claim 14, wherein:
the processor is configured to identify a subset of time regions from a set of time regions, each time region within the subset of time regions comprising one or more instances of the CFRA resource, wherein the timing pattern for the CFRA resource is based at least in part on the subset of time regions.

19. The wireless communication node of claim 14, wherein:
the signal is transmitted in a first radio frequency spectrum band and the RACH transmission is received in a second radio frequency spectrum band, the second radio frequency spectrum band being different from the first radio frequency spectrum band; or the signal is transmitted via a first radio access technology (RAT) and the RACH transmission is received via a second RAT, the second RAT being different from the first RAT.

20. The wireless communication node of claim 14, wherein the location of the CFRA resource comprises at least one of a symbol within a slot, or a slot within a subframe, or a subframe within a radio frame, or a radio frame within a set of radio frames, or a combination thereof.

21. The wireless communication node of claim 14, wherein the CFRA resource is associated with a time-frequency region, and the CFRA resource comprises a RACH occasion.

22. The wireless communication node of claim 14, wherein the wireless communication node comprises a network entity, wherein the receiver is configured to receive, by the network entity, the signal from a target cell, and wherein the transmitter is configured to transmit, by the network entity, the signal to a serving cell to be relayed to the one or more UEs.

23. The wireless communication node of claim 14, wherein the time region comprises at least one of a frame, a subframe, a slot, or a mini-slot.

24. A wireless communication node, comprising:
   means for transmitting, for one or more user equipments (UEs), a signal indicating a location of a contention free random access channel (CFRA) resource within a time region and indicating a number of actually transmitted synchronization signal block (SSB) signals, wherein:
      the CFRA resource is based at least in part on the actually transmitted SSB signals and is partially overlapping and not fully overlapping in time with respect to a contention based random access (CBRA) resource,
      the signal indicates a timing pattern for the CFRA resource via a symbol index within a radio frame and a system frame n umber configuration index,
      the timing pattern associated with a pattern of subsequent instances of the time region in which the CFRA resource is repeated, and
      the signal indicates a physical random access channel (PRACH) configuration index to provide at least one of the location of the CFRA resource, or the indication of the timing pattern for the CFRA resource, or a combination thereof; and
   means for determining the timing pattern based at least in part on the symbol index and the system frame number configuration index; and
   means for receiving, during at least one instance of the CFRA resource within the time region, a random access channel (RACH) transmission using the CFRA resource.

25. The wireless communication node of claim 24, wherein the timing pattern comprises at least one of a periodic pattern or an aperiodic pattern.

26. The wireless communication node of claim 24, further comprising:
   means for identifying one or more symbols within the time region in which the CFRA resource will occur, wherein the location is based at least in part on the one or more symbols.

27. The wireless communication node of claim 24, further comprising:
   means for identifying a subset of time regions from a set of time regions, each time region within the subset of time regions comprising one or more instances of the CFRA resource, wherein the timing pattern for the CFRA resource is based at least in part on the subset of time regions.

* * * * *